Nov. 6, 1951     G. J. RUNDBLAD     2,573,810
LIQUID PROCESS DUPLICATING MACHINE
Filed Jan. 18, 1945     15 Sheets-Sheet 1
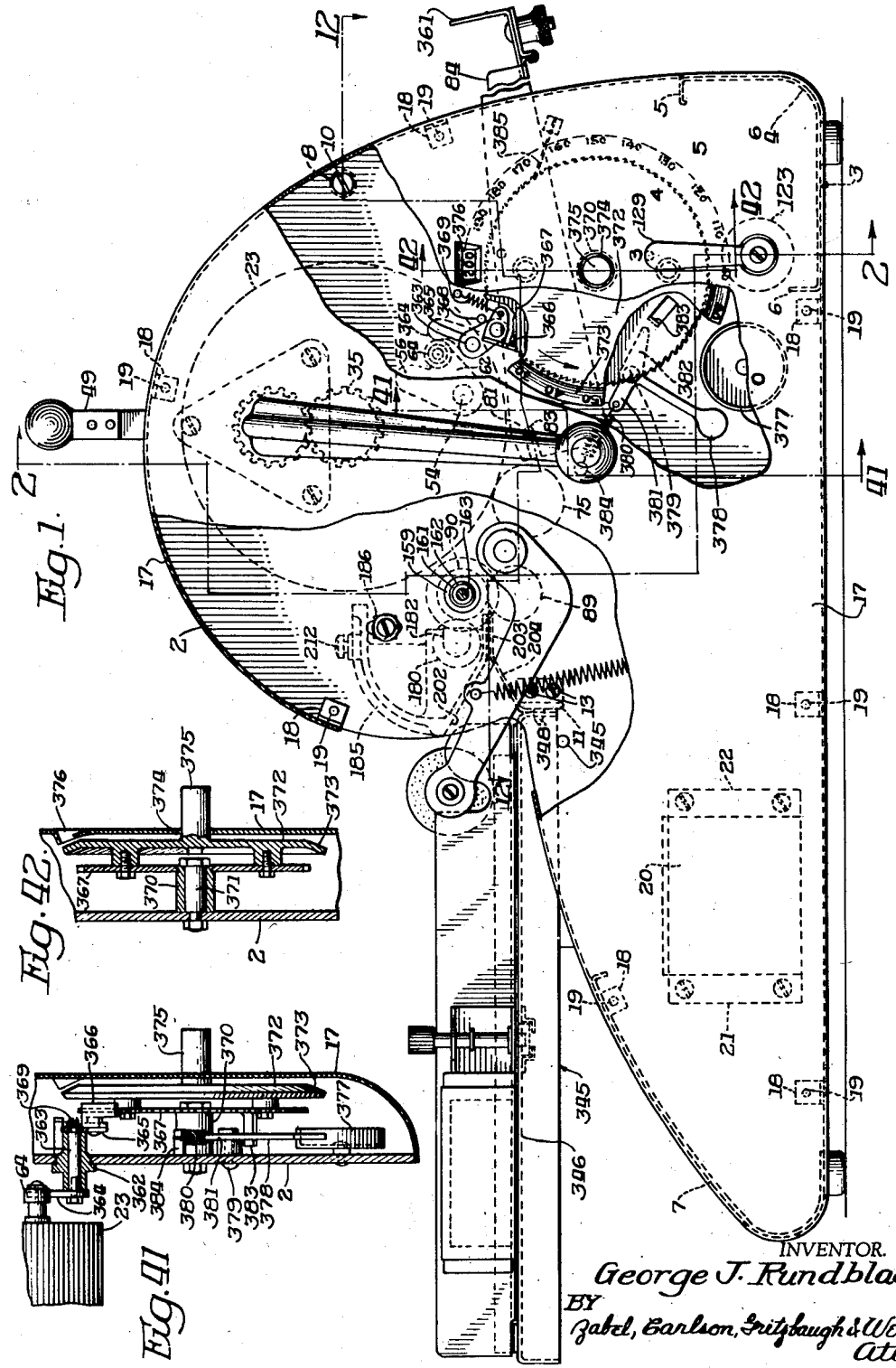
INVENTOR.
George J. Rundblad
BY
Zabel, Carlson, Fitzhaugh & Wells
Attys

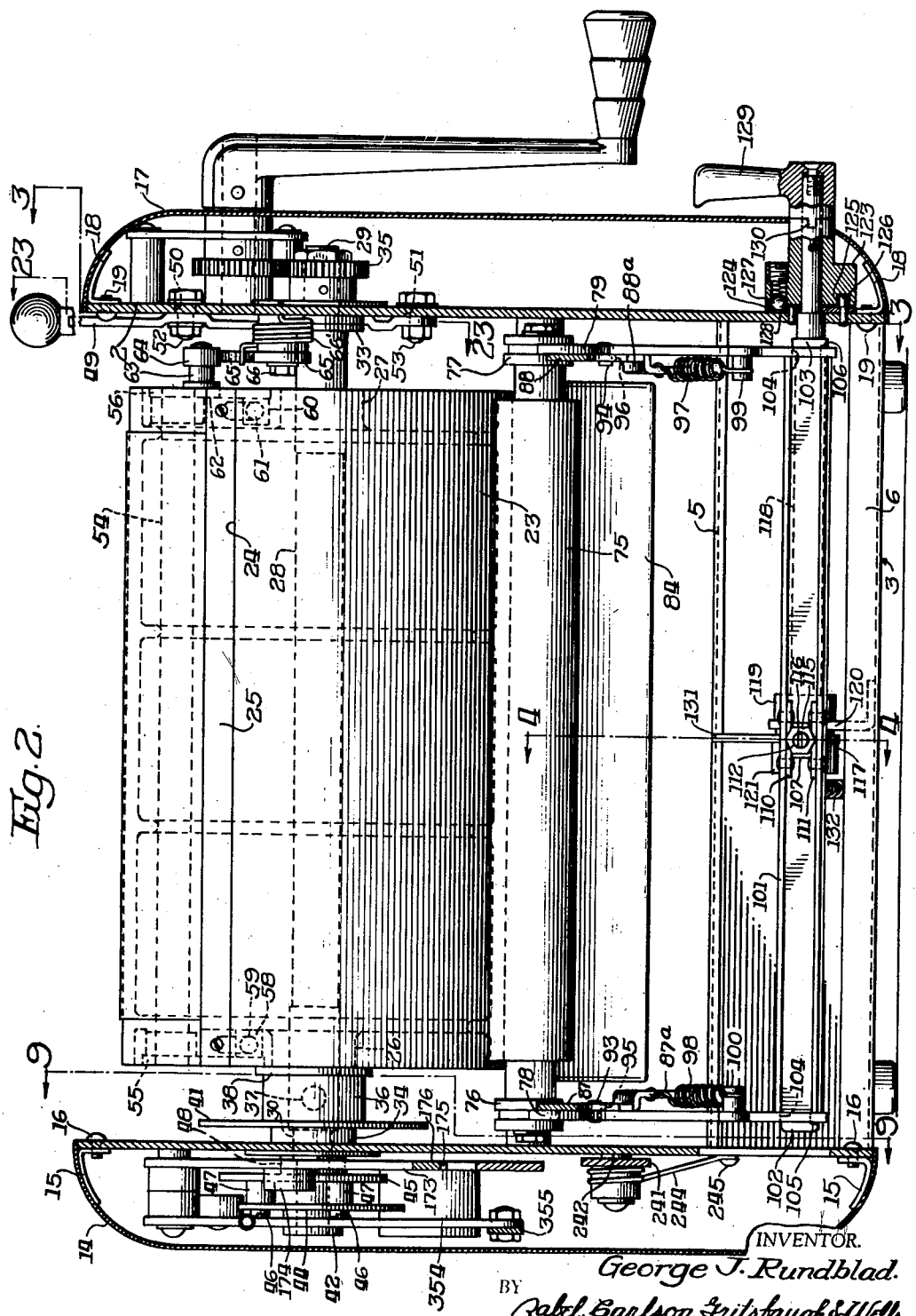

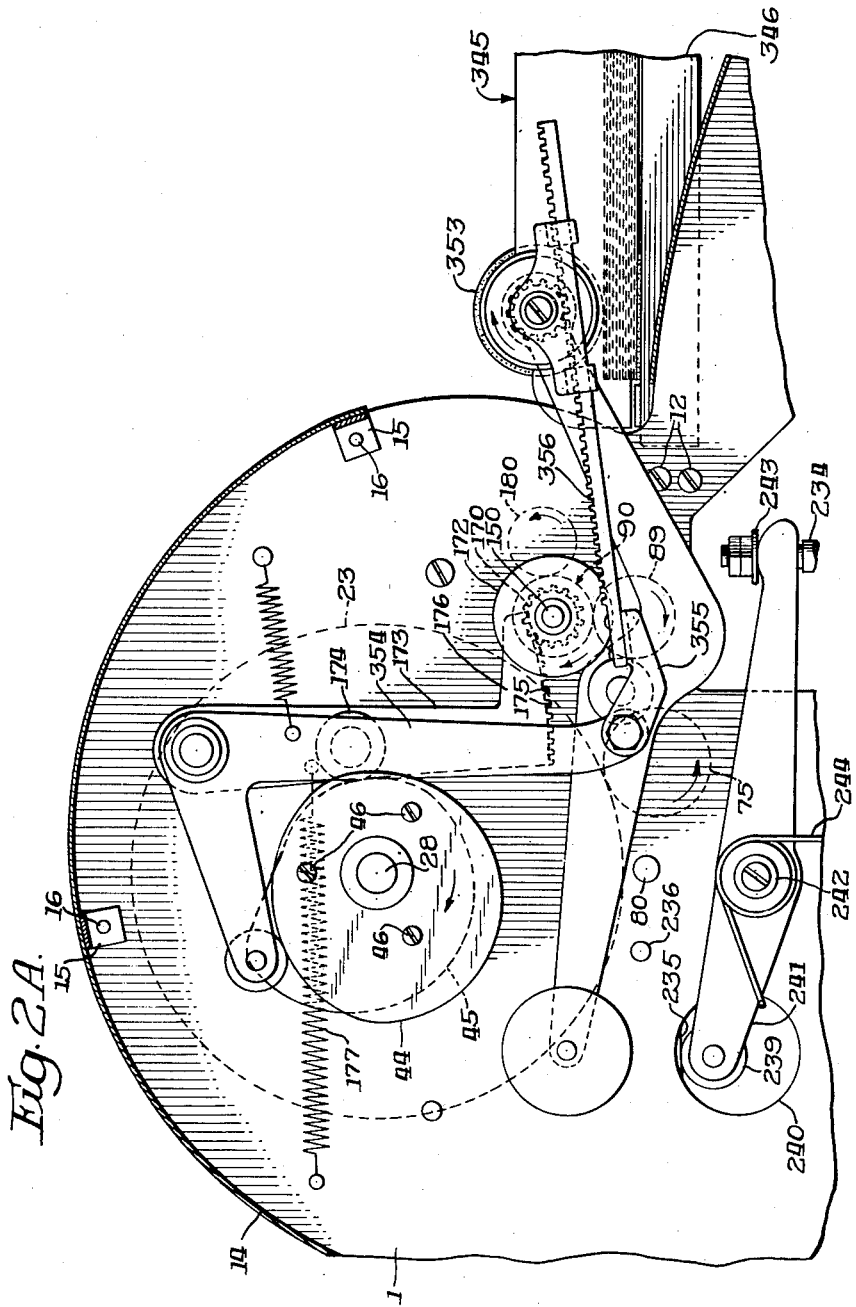

Nov. 6, 1951  G. J. RUNDBLAD  2,573,810
LIQUID PROCESS DUPLICATING MACHINE
Filed Jan. 18, 1945  15 Sheets-Sheet 4

INVENTOR.
George J. Rundblad.
BY
Zabel, Carlson, Fitzbaugh & Wells.
Attys.

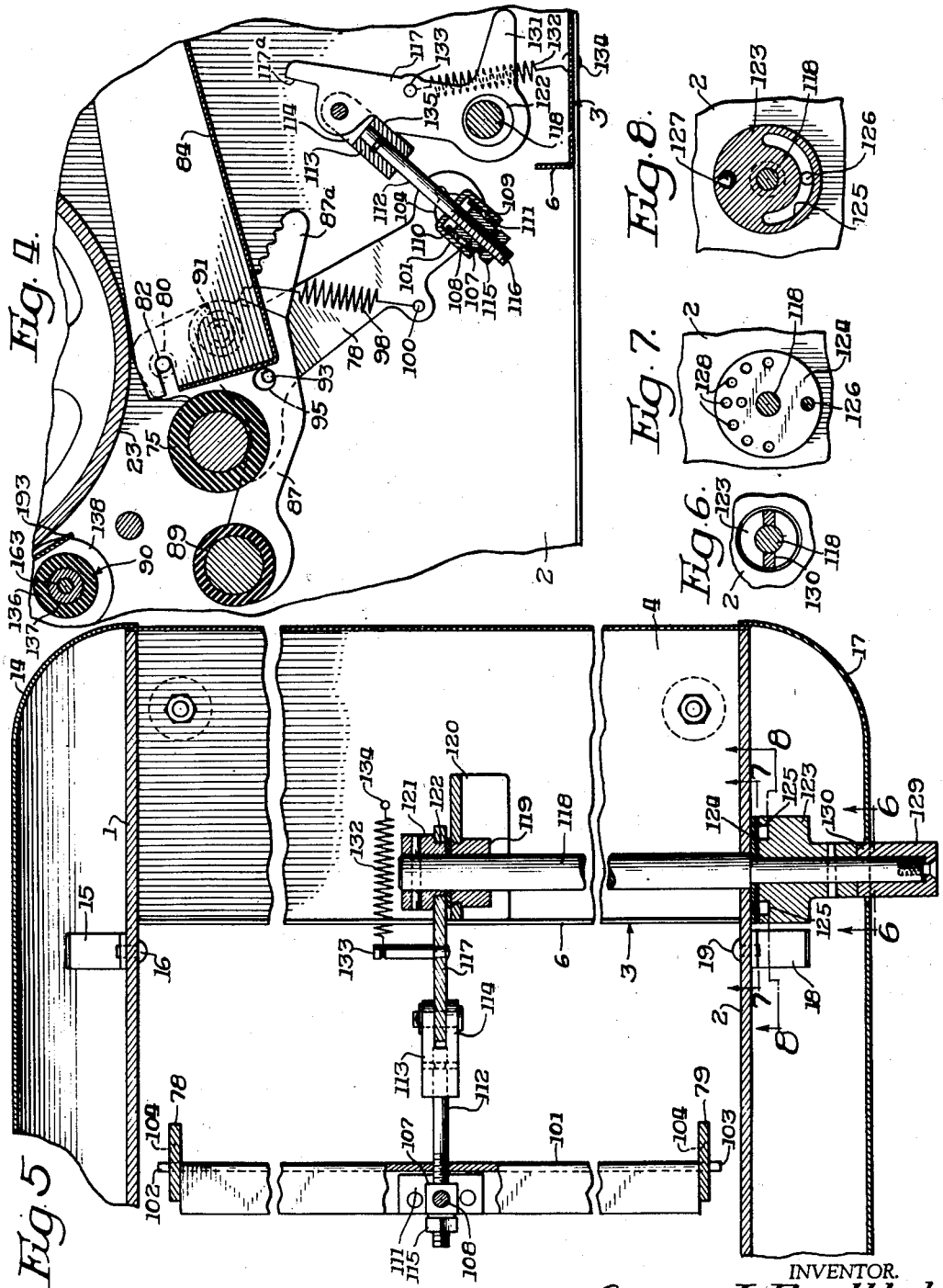

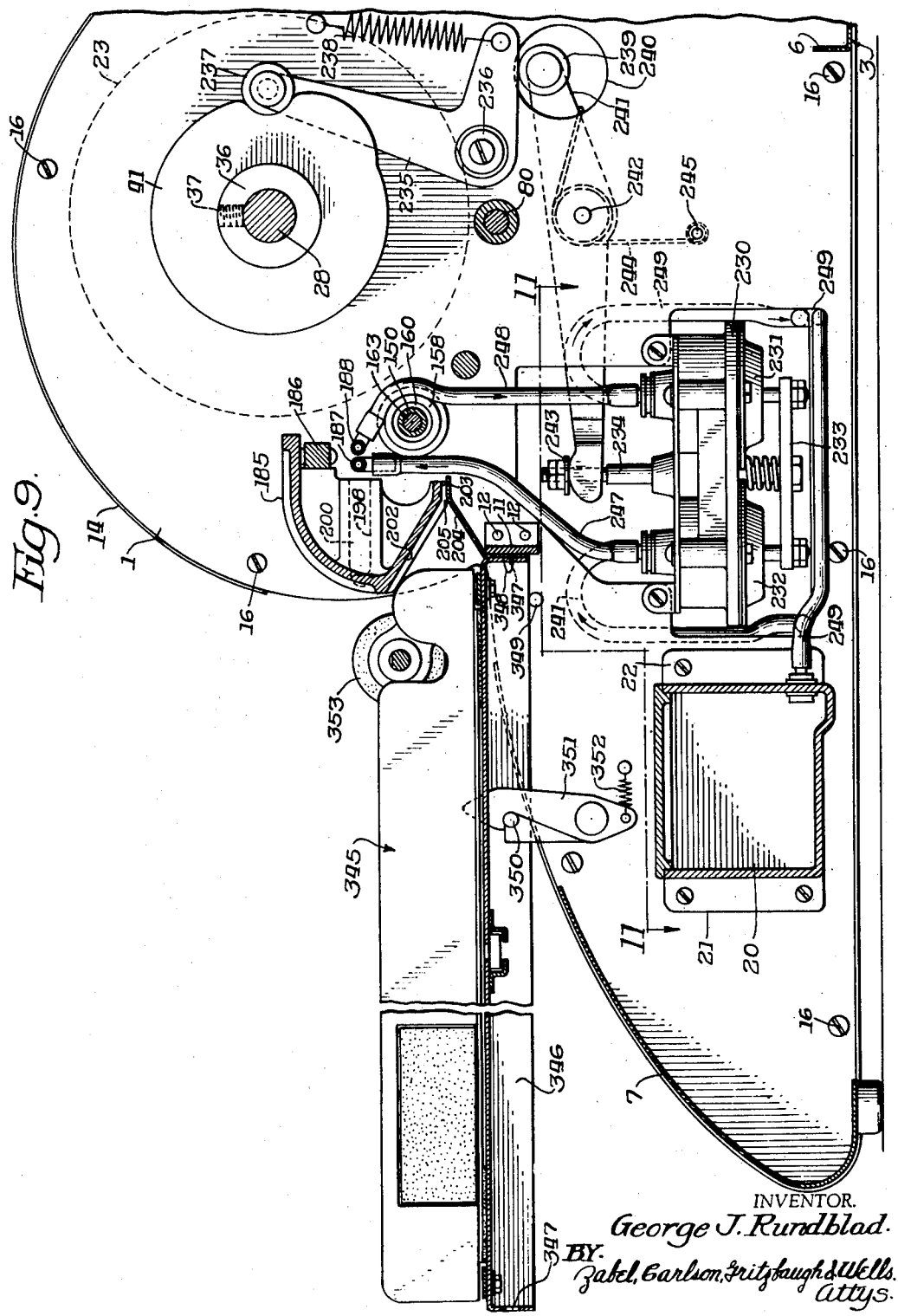

Nov. 6, 1951
G. J. RUNDBLAD
2,573,810
LIQUID PROCESS DUPLICATING MACHINE
Filed Jan. 18, 1945
15 Sheets-Sheet 7
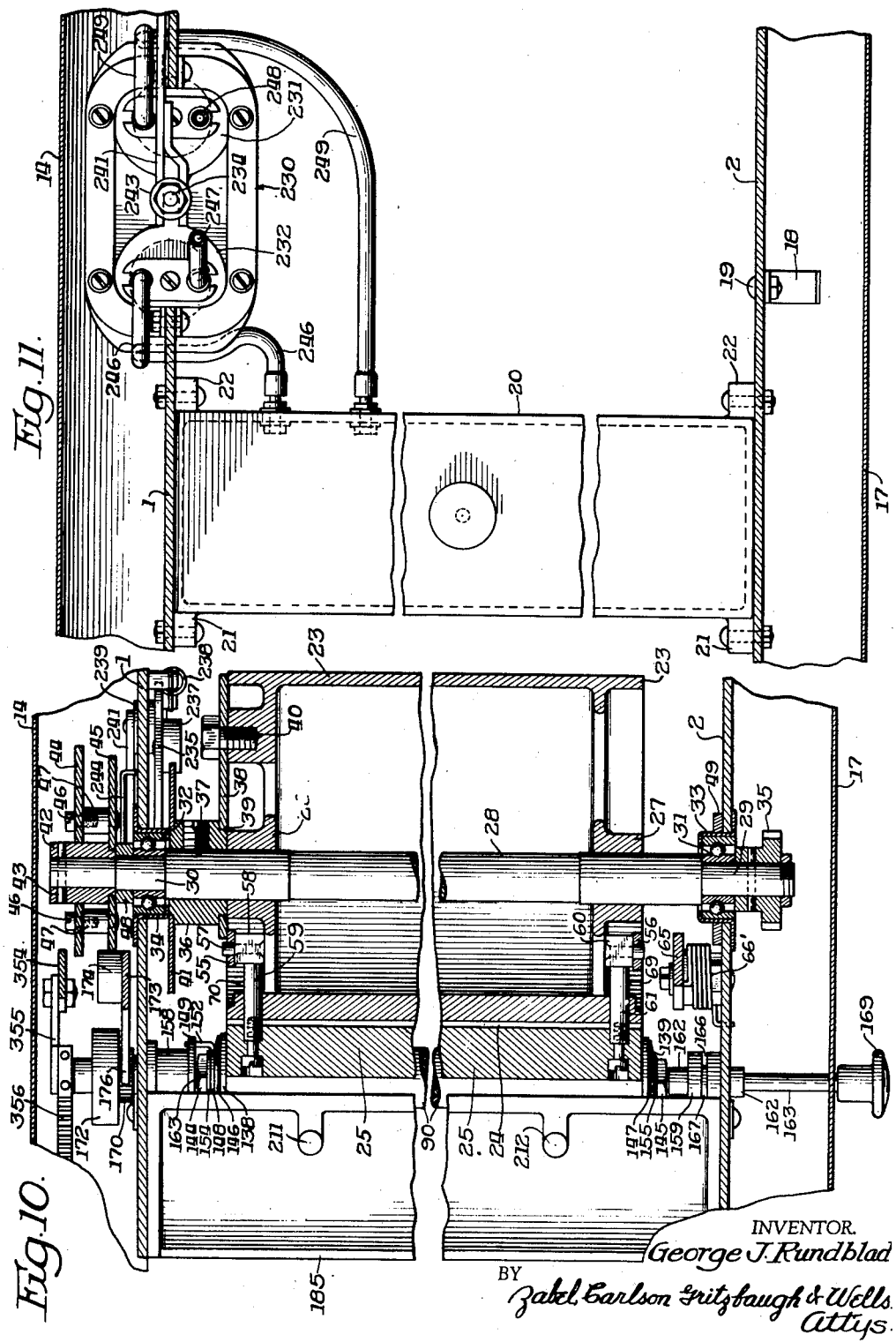
INVENTOR.
George J. Rundblad
BY
Zabel, Carlson, Fritzhaugh & Wells
Attys.

Nov. 6, 1951     G. J. RUNDBLAD     2,573,810
LIQUID PROCESS DUPLICATING MACHINE
Filed Jan. 18, 1945     15 Sheets-Sheet 8
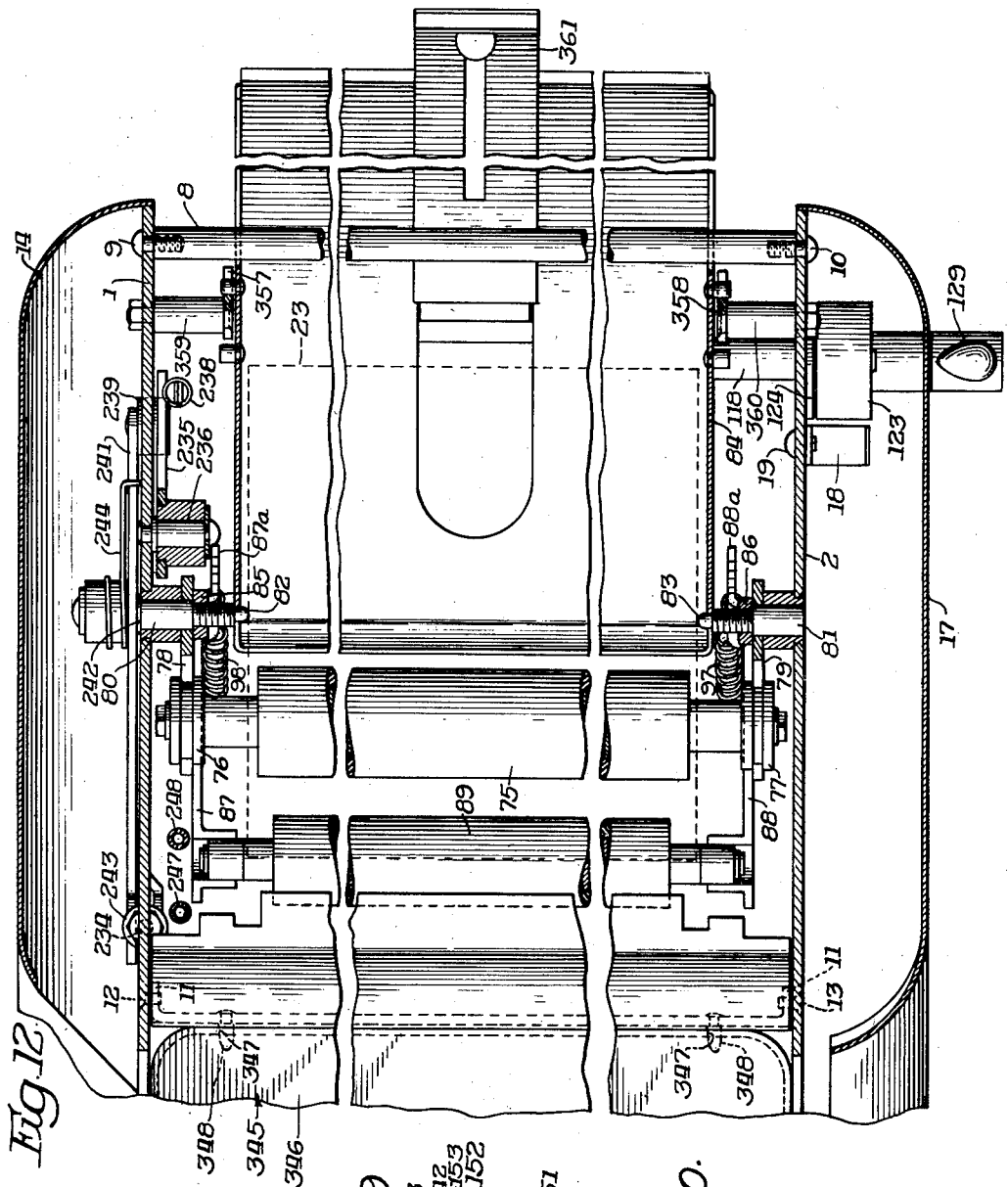
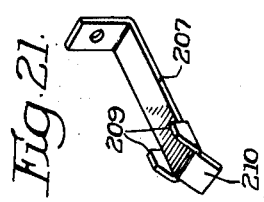
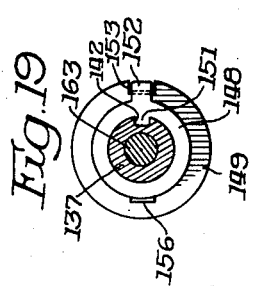
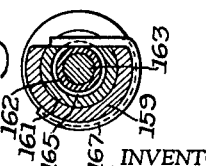
INVENTOR.
George J. Rundblad.
BY Zabel, Carlson, Gritzbaugh & Wells
Attys.

Nov. 6, 1951     G. J. RUNDBLAD     2,573,810
LIQUID PROCESS DUPLICATING MACHINE
Filed Jan. 18, 1945     15 Sheets-Sheet 9
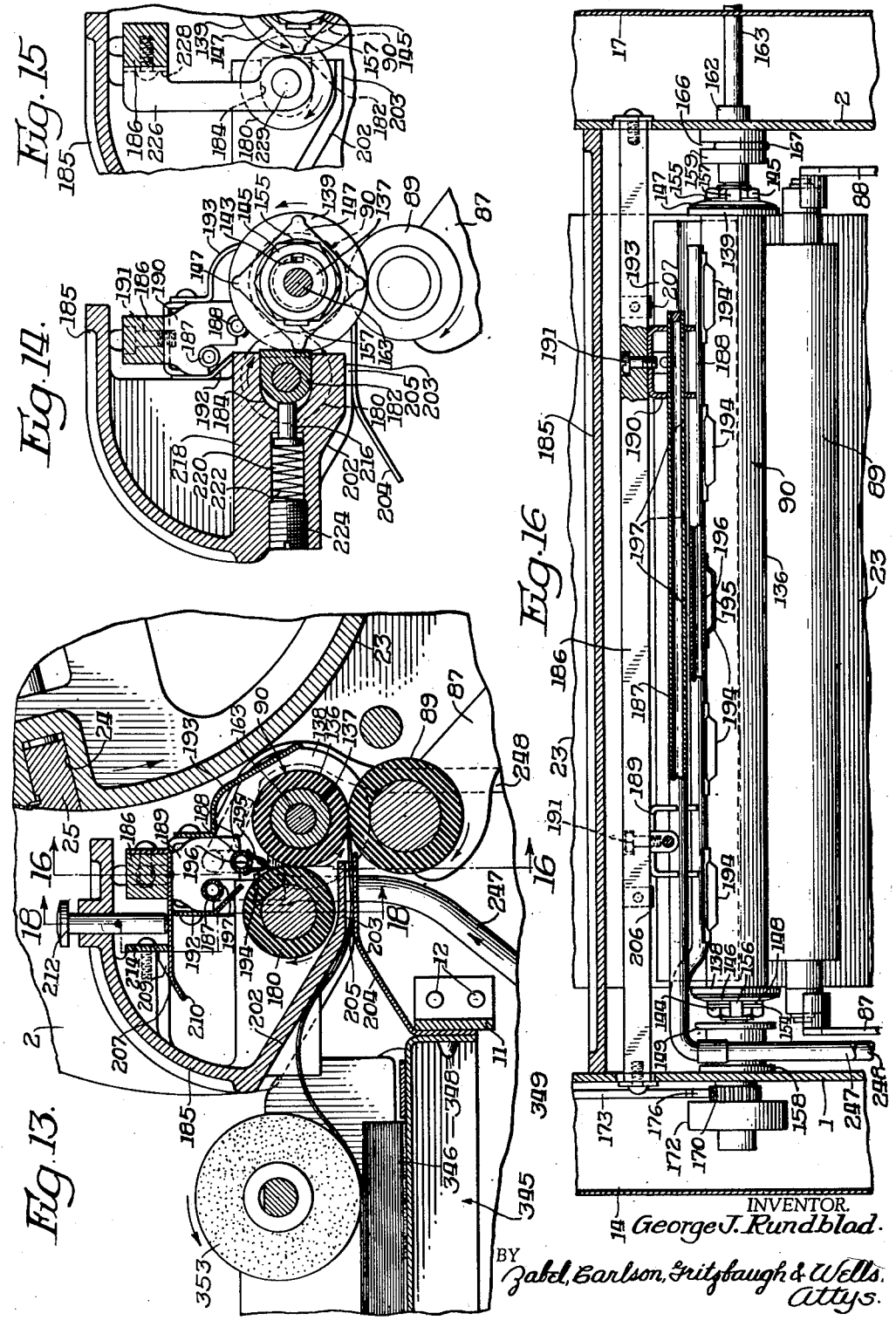

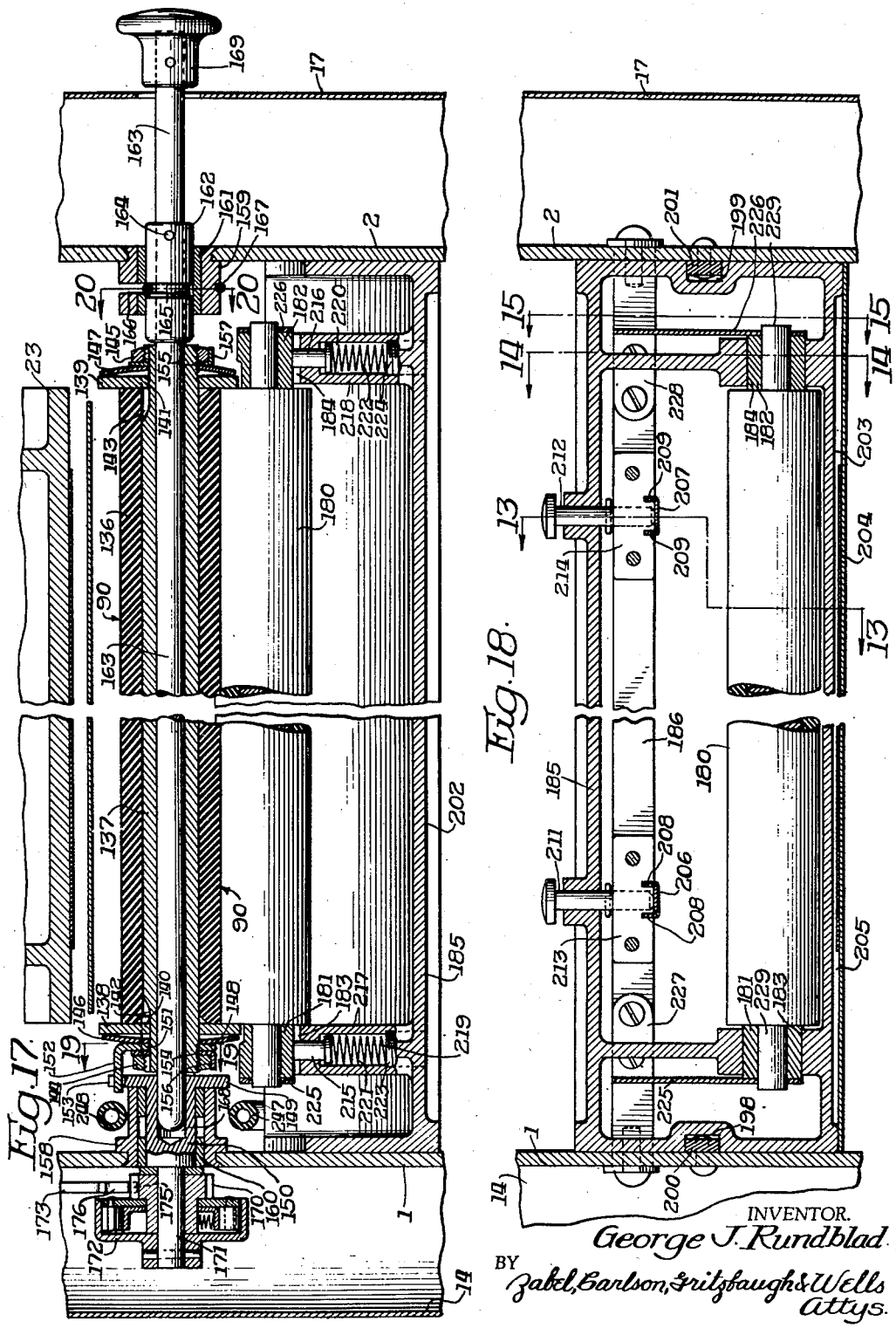

Nov. 6, 1951  G. J. RUNDBLAD  2,573,810
LIQUID PROCESS DUPLICATING MACHINE
Filed Jan. 18, 1945  15 Sheets-Sheet 11
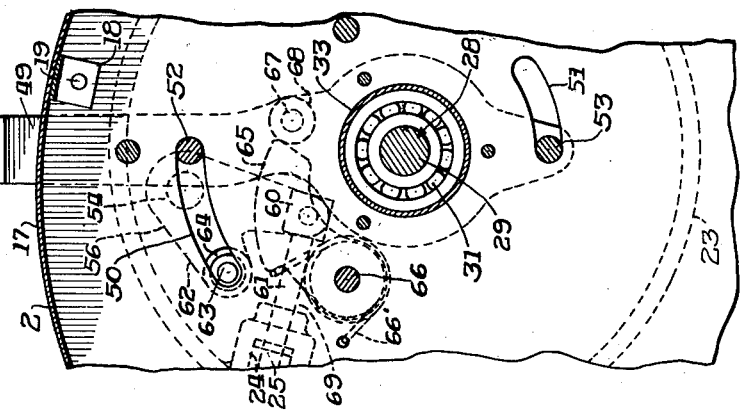
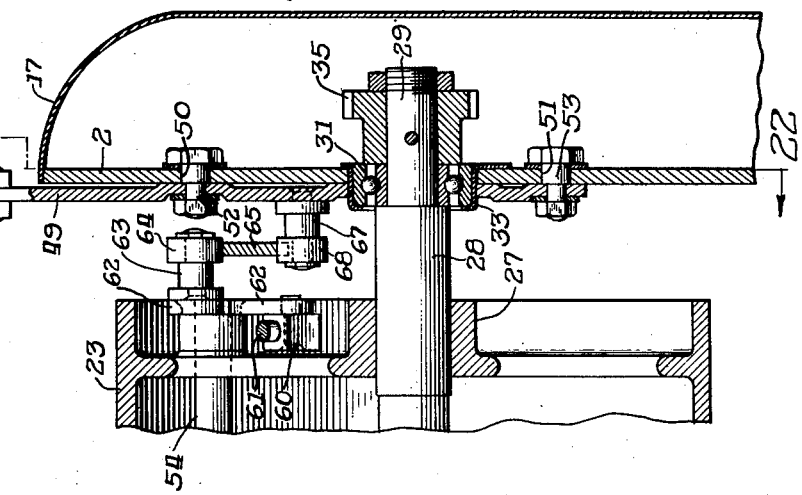
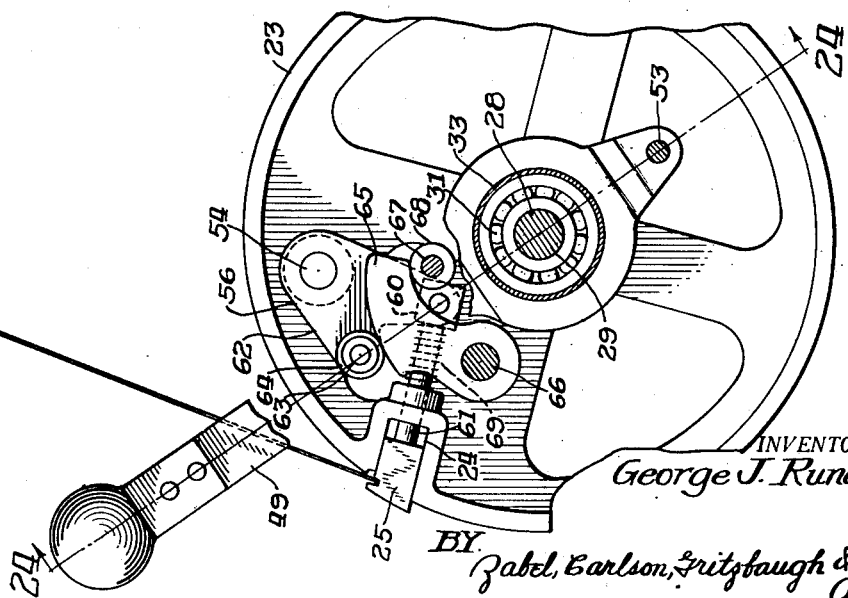
INVENTOR.
George J. Rundblad
BY
Zabel, Carlson, Fritzbaugh & Wells
Attys Nov. 6, 1951  G. J. RUNDBLAD  2,573,810
LIQUID PROCESS DUPLICATING MACHINE
Filed Jan. 18, 1945  15 Sheets-Sheet 12
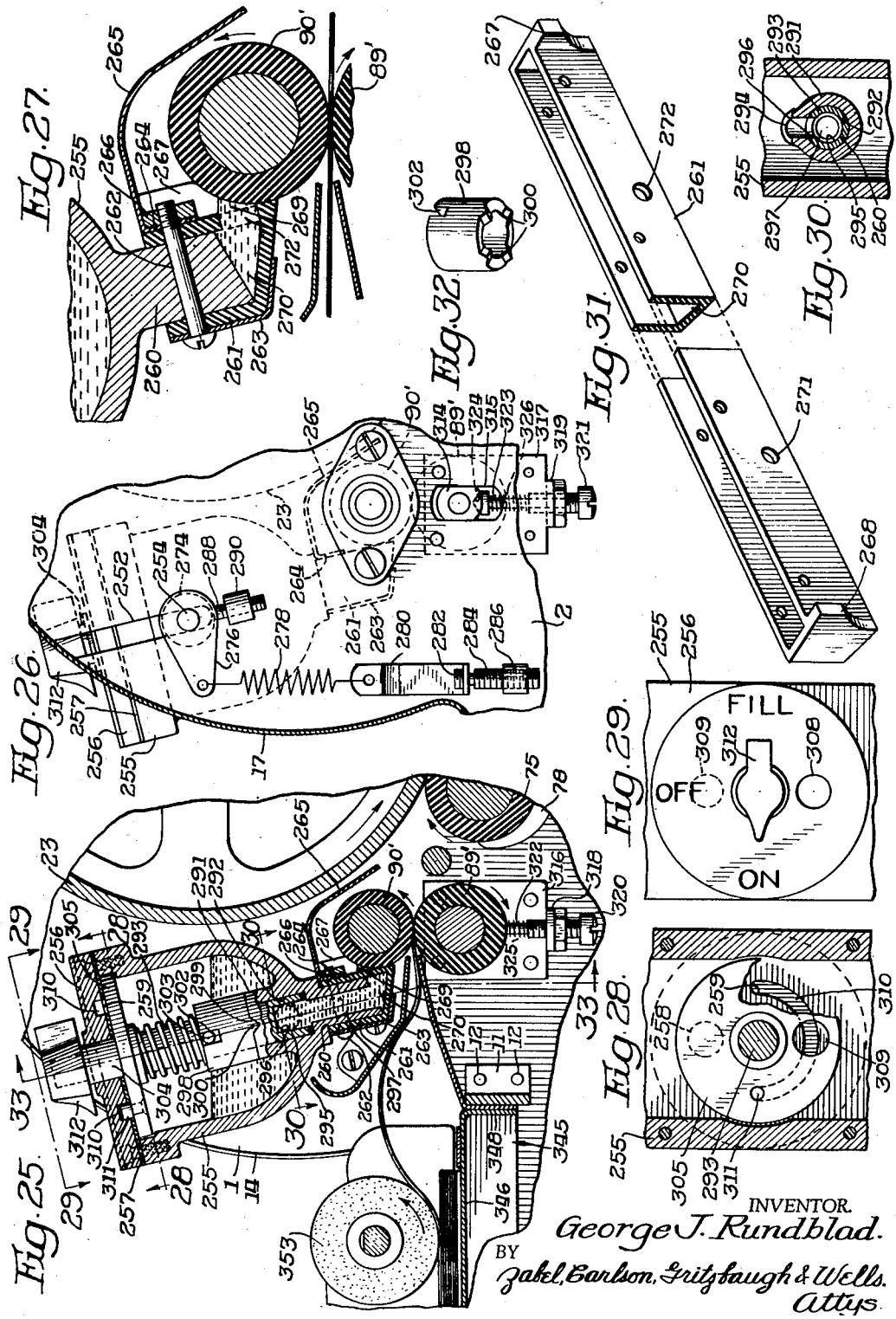
INVENTOR.
George J. Rundblad.
BY
Zabel, Carlson, Gritzbaugh & Wells.
Attys.

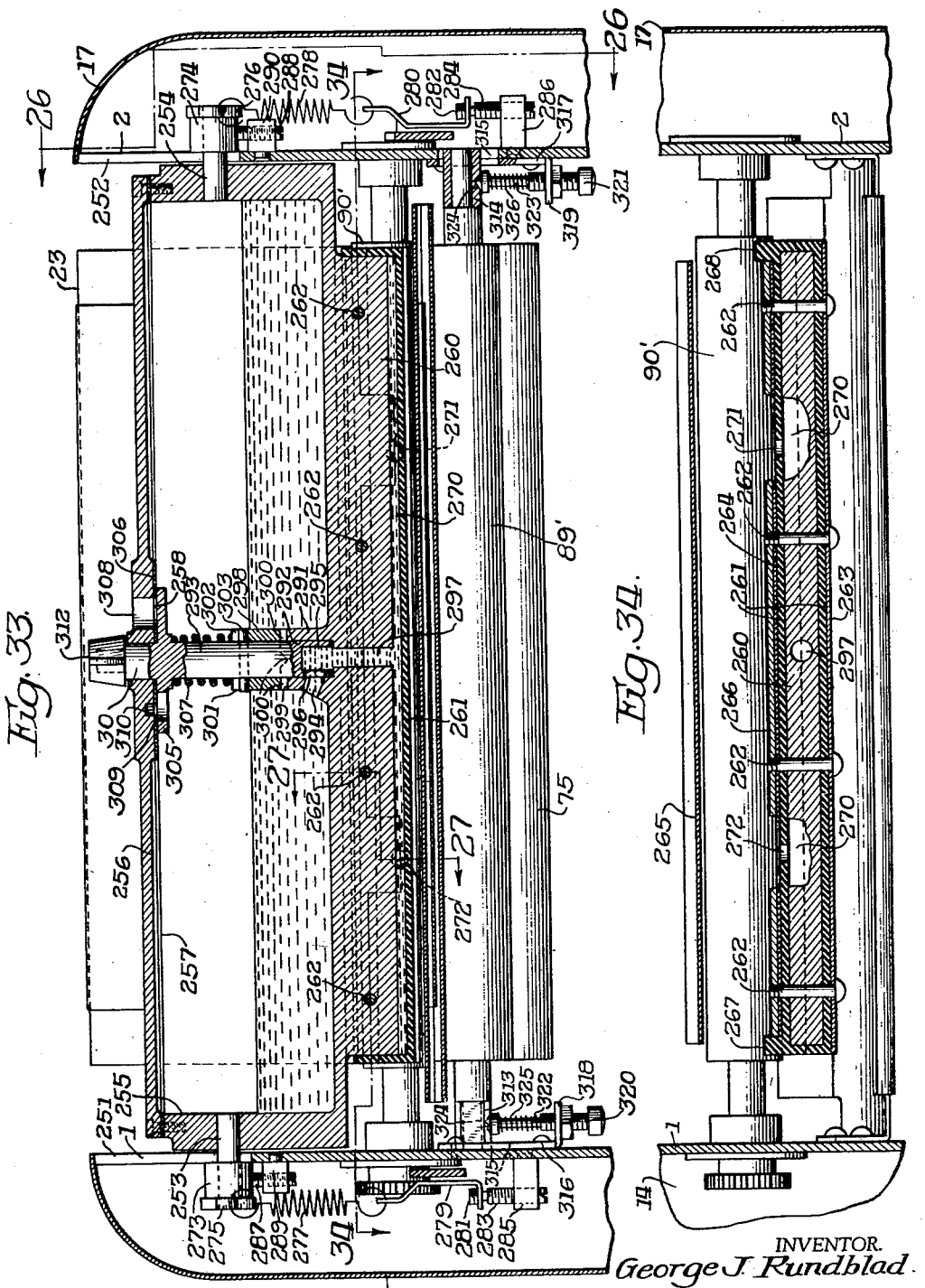

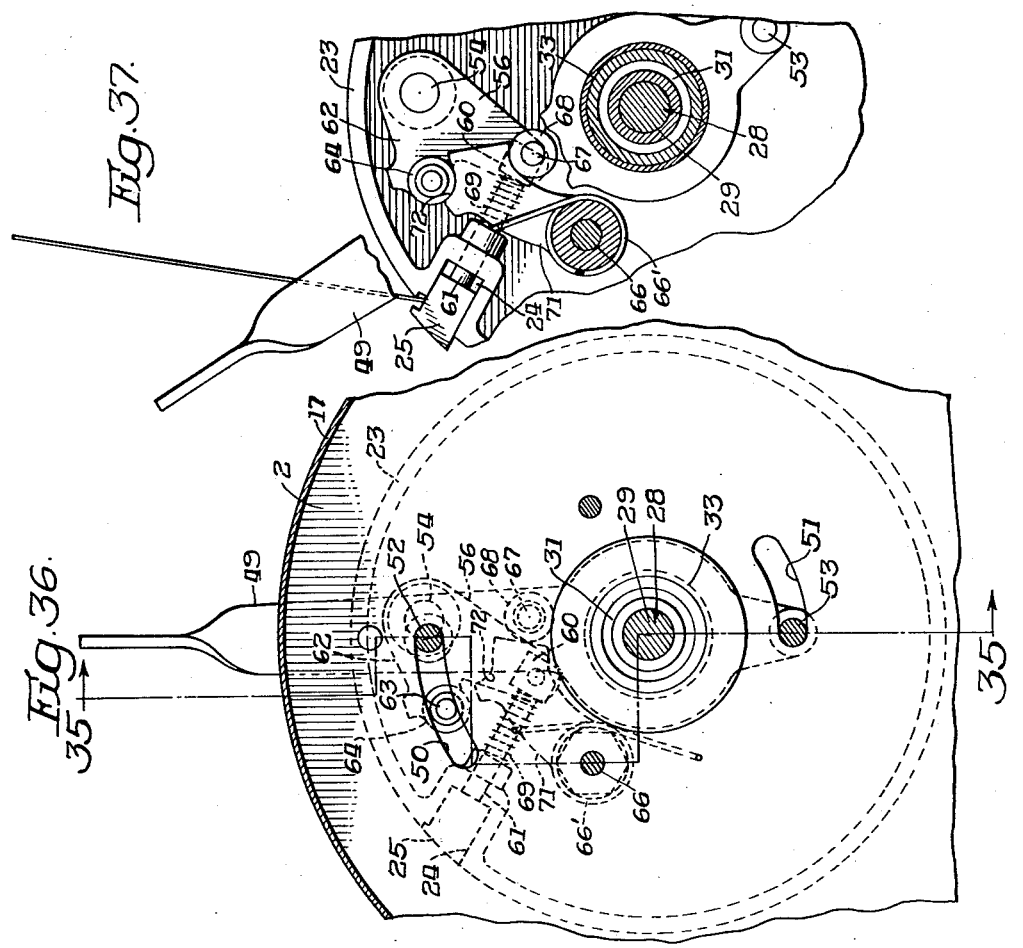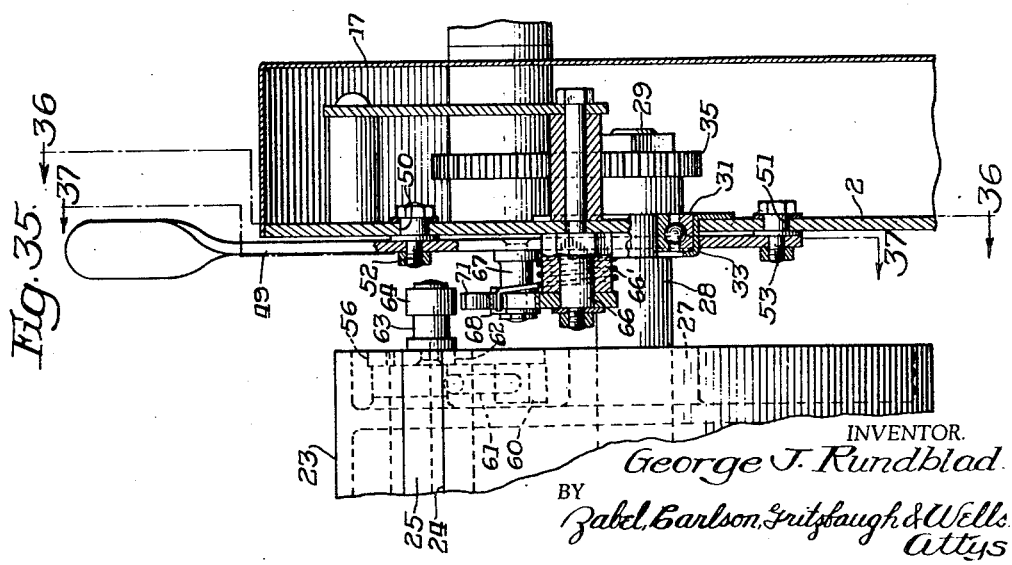

Nov. 6, 1951     G. J. RUNDBLAD     2,573,810
LIQUID PROCESS DUPLICATING MACHINE
Filed Jan. 18, 1945     15 Sheets-Sheet 15
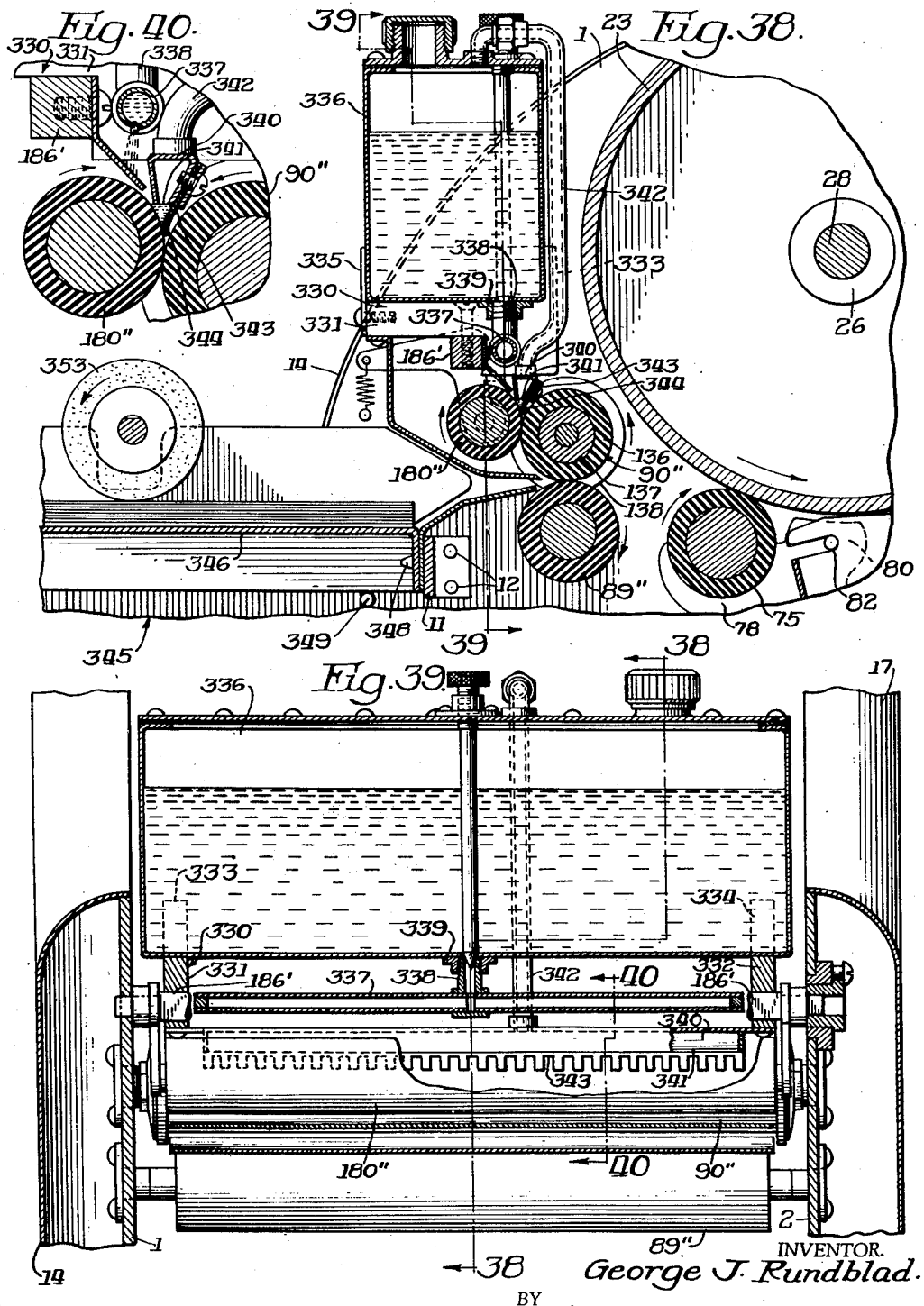
INVENTOR.
George J. Rundblad.

Patented Nov. 6, 1951

2,573,810

UNITED STATES PATENT OFFICE 2,573,810

LIQUID PROCESS DUPLICATING MACHINE

George J. Rundblad, Elmwood Park, Ill., assignor to Ditto, Incorporated, Chicago, Ill., a corporation of West Virginia Application January 18, 1945, Serial No. 573,413

32 Claims. (Cl. 101—132.5)

The present invention relates to duplicating machines and more particularly to those duplicating machines of the so called liquid process type wherein copies are made on moistened copy sheets from a master sheet having the copyable matter placed thereon in reverse. The copy sheets are moistened with a suitable solvent for the ink on the master sheet. One of the principal purposes of the present invention is to provide a machine of this character with a novel frame and mounting structure which readily lends itself to low cost production and wherein support and operating functions are combined in a novel way to reduce the number of parts necessary.

A further feature of the present invention is to provide an improved means for controlling the application of pressure between the master sheet and the copy sheets whereby to facilitate making of proper copies and to eliminate tendency of the rollers that engage the sheets and press them together to become irregular and to therefore, produce uneven impressions on the sheets.

My invention further contemplates a novel moistener construction cooperating with the rollers to insure adequate moistening of the copy sheets.

In the preferred embodying of the invention, the novel features hereinbefore mentioned and other features of novelty are combined to produce a duplicating machine wherein the frame structure supports a rotatable drum in position to be utilized for mounting master sheets thereon, the drum being rotatable by a suitable hand wheel. The machine further provides a moistening mechanism, one form of which is specifically improved to cooperate with the pressure controlling mechanism of the machine so as to produce adequate moistening with a very simple mechanism. The parts of the machine are so combined as to utilize operating parts as structural supports, and to utilize cross ties and the side frames as mounting means for other parts in a novel manner.

The nature of my invention will appear more fully from the following description and the accompanying drawings wherein a preferred form of the invention is shown. It should be understood however, that the drawings and description are illustrative only and are not to be taken as limiting the invention, except insofar as it is limited by the claims.

In the drawings:

Figure 1 is a view in side elevation of a duplicating machine embodying my invention, certain parts of the machine being broken away to show the interior construction;

Figure 2 is a sectional view taken on the line 2—2 of Figure 1;

Figure 2a is a fragmentary view in side elevation of the opposite end of the machine from that shown in Figure 1 with the cover broken away;

Figure 4 is a fragmentary sectional view taken on the line 4—4 of Figure 2;

Figure 5 is a fragmentary sectional view taken on the line 5—5 of Figure 3;

Figure 3:
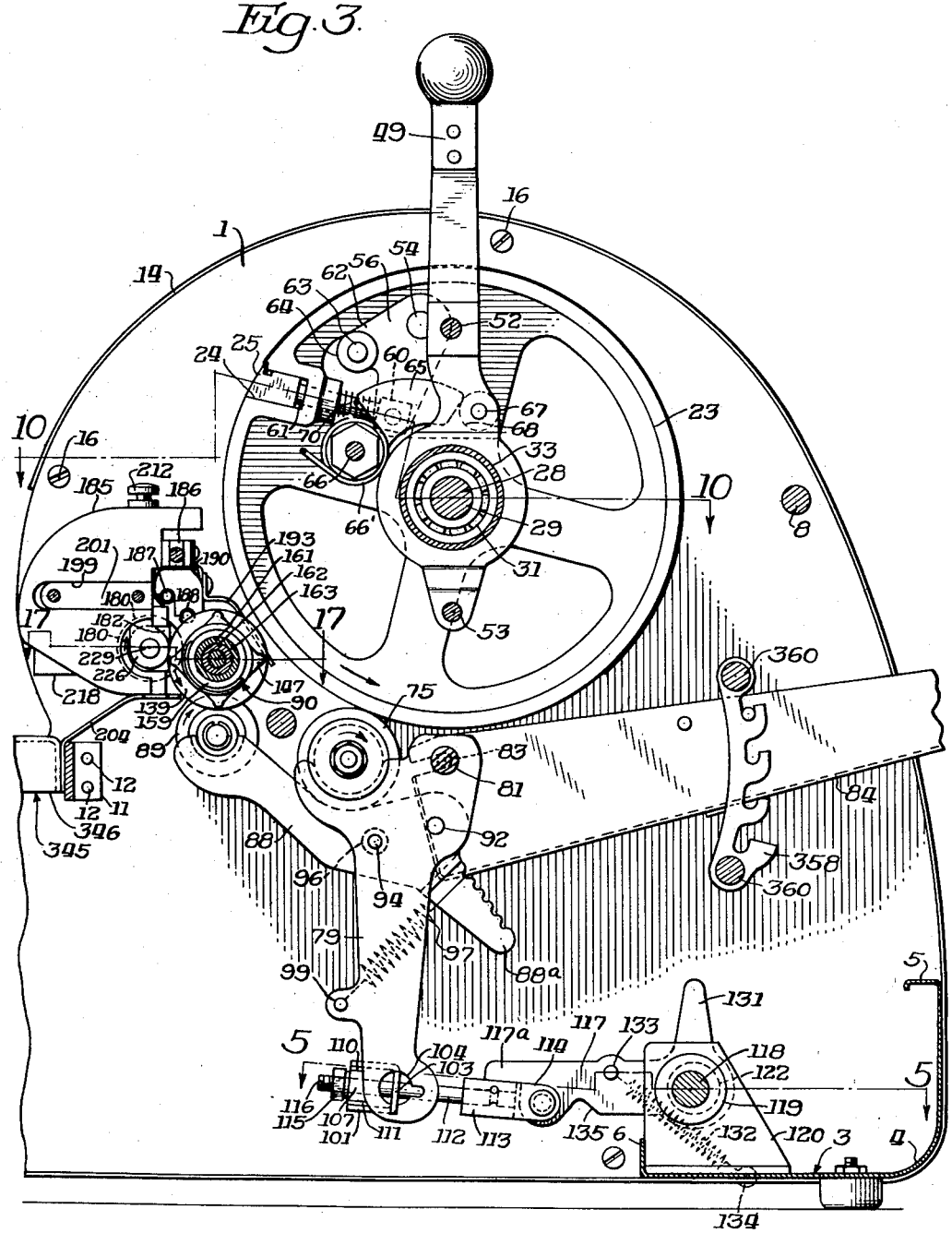
Figure 3 is a sectional view taken on the line 3—3 of Figure 2.

Figures 6, 7 and 8 are fragmentary sectional views taken on the lines 6—6, 7—7, and 8—8 of Figure 5;

Figure 9 is a sectional view taken on the line 9—9 of Figure 2;

Figure 10 is a sectional view taken on the line 10—10 of Figure 3;

Figure 11 is a fragmentary sectional view taken on the line 11—11 of Figure 9;

Figure 12 is a fragmentary sectional view taken on the line 12—12 of Figure 1;

Figure 13 is an enlarged fragmentary sectional view taken transversely through the moistening mechanism on the line indicated at 13—13 in Figure 18;

Figure 14 and Figure 15 are fragmentary sectional views taken on the lines 14—14 and 15—15 respectively of Figure 18;

Figure 16 is a sectional view taken on the line 16—16 of Figure 13;

Figure 17 is a horizontal sectional view taken on the line 17—17 of Figure 3;

Figure 18 is a sectional view taken on the line 18—18 of Figure 13;

Figure 19 is a fragmentary sectional view taken on the line 19—19 of Figure 17;

Figure 20 is a sectional view taken on the line 20—20 of Figure 17;

Figure 21 is a perspective view of one of the mounting elements of the moistening mechanism illustrated in Figures 13 to 18 inclusive;

Figure 22 is a fragmentary sectional view looking to the left as shown by the line 22—22 of Figure 24;

Figure 23 is a fragmentary sectional view taken on the line 23—23 of Figure 2;

Figure 24 is a sectional view taken on the line 24—24 of Figure 23;

Figures 25 to 34 inclusive illustrate a modified moistening mechanism wherein Figure 25 is a fragmentary sectional view similar to Figure 13;

Figure 26 is a fragmentary sectional view taken substantially on the line 26—26 of Figure 33;

Figure 27 is a sectional view taken on the line 27—27 of Figure 33;

Figure 28 is a fragmentary sectional view taken on the line 28—28 of Figure 25;

Figure 29 is a fragmentary view looking down on Figure 25 as indicated by the line 29—29 of Figure 25;

Figure 30 is a fragmentary sectional view taken on the line 30—30 of Figure 25;

Figure 31 is a perspective view of a rubber trough forming part of the moistening mechanism shown in Figures 25 to 34;

Figure 32 is a perspective view of a part of the valve unit utilized in the moistening mechanism;

Figure 33 is a sectional view taken on the line 33—33 of Figure 25;

Figure 34 is a sectional view taken on the line 34—34 of Figure 33;

Figure 35 is a sectional view taken substantially on the line 35—35 of Figure 36;

Figure 36 is a sectional view taken on the line 36—36 of Figure 35;

Figure 37 is a fragmentary sectional view taken on the line 37—37 of Figure 35;

Figure 38 is a sectional view similar to Figures 13 and 25 showing a further modification of the moistening mechanism;

Figure 39 is a sectional view taken on the line 39—39 of Figure 38;

Figure 40 is a fragmentary sectional view taken on the line 40—40 of Figure 39;

Figure 41 is a fragmentary sectional view taken on the line 41—41 of Figure 1; and Figure 42 is a fragmentary sectional view taken on the line 42—42 of Figure 1.

Referring now to the drawings and particularly to Figures 1, 2, 3, 9 and 12, the duplicating machine embodying my invention has a frame which is made up of two side pieces 1 and 2. These side pieces are of sheet metal cut to the proper shape as indicated by the outline in Figure 1. The two side pieces are connected at the back by a strip 3 of metal which is bent into an angular shape shown best in Figure 3 so as to provide a rounded corner and two edge flanges. The rounded corner is indicated by the numeral 4 while the flanges are indicated by the numerals 5 and 6. Preferably the strip 3 is welded to the side frames 1 and 2, although of course, it may be secured in any suitable fashion. At the front of the machine another strip 7, which is curved into the shape best illustrated by the cross section in Figure 9, serves to connect the side frames 1 and 2. A cross tie rod 8 is provided above the strip 3 near the top of the side pieces 1 and 2. This cross tie rod is fastened to the side pieces 1 and 2 by suitable screws shown at 9 and 10 in Figure 12. Near the front cross strip 7 the side pieces are connected together by a flat bar 11 which has its ends turned over at right angles to the bar itself and fastened to the side pieces by suitable screws such as 12 and 13 shown in Figure 12.

Each of the side pieces has a housing attached thereon to cover the various elements mounted on the side pieces. The housing covering the side piece 1 is identified by the numeral 14 as shown. The housing 14 is a cupped metal sheet formed to fit the contour of the side piece 1 except for certain cut-out portions where it is not needed. The housing 14 is secured by means of suitable clips 15 that are welded to it or otherwise secured. These clips are then fastened to the side frame 1 by suitable screws 16. The side frame 2 carries a similar housing 17 to that carried by the side frame 1. The housing 17 is secured to the side frame 2 by means of clips 18 welded to the housing, and screws 19. The whole framework just described is quite light in its construction, yet it is quite rigid by virtue of the connections between the side frames already described and because the side frames are further connected by certain operating parts of the mechanism. One such part comprises a tank 20 for moistening fluid. This tank has end flanges 21 and 22 at both ends. These end flanges are connected by screw bolts to the side frames 1 and 2. The construction thus far described provides a rigid supporting frame for the operating parts of the duplicating mechanism.

Referring again now to Figures 1, 2 and 3 and to Figure 10, these figures illustrate the mounting of the duplicating drum 23 on which master sheets are mounted and rotated in engagement with moistened copy sheets. The master sheets are held in the drum 23 in a slot 24 extending longitudinally thereof in which a sheet gripping bar 25 is also mounted. The drum is provided with two hubs 26 and 27 through which a mounting shaft 28 extends. The shaft 28 has its ends reduced in diameter as shown at 29 and 30 (see Figure 10). The reduced shaft portions have ball bearings 31 and 32 thereon. These ball bearings are carried in suitable mounting cups 33 and 34 which can be shoved into openings provided in the side frames 1 and 2 for a simple quick assembly of the side frames with the bearings. A pinion 35 is secured to the reduced end portion 29 of the shaft. The other end of the shaft carries a number of cams and hubs for the cams. One hub 36 is secured to the shaft 28 adjacent the hub 26 by a set screw 37. This hub 36 has a plate 38 secured thereon as indicated at 39. The plate 38 is fastened to the drum 23 by a screw bolt 40. The hub 36 has a cam 41 secured thereto. Between the side frame 1 and its cover 14 the shaft 28 has a collar 42 secured upon it by a pin 43. The collar 42 carries two cam members 44 and 45, these cam members being connected together by screws 46 and spacing members 47. A spacing washer 48 is provided on the shaft 28 between the bearing 32 and the cam 45.

The drum has means mounted thereon for actuating the gripper bar 25. This means is shown more in detail in Figures 22 to 24 inclusive, although portions thereof are shown in Figures 1 to 3 and Figure 10 of the drawings. The side frame 2 has a hand lever 49 pivoted thereto, the housing 33 of the bearing 31 serving as a pivot for the lever 49. The side frame 2 has two slots 50 and 51 therein and the lever 49 carries two pins 52 and 53 riding in the respective slots 50 and 51. These slots can be made to provide more or less frictional engagement between the side frame and the lever. The drum has a shaft 54 therein, and this shaft has two bell crank levers 55 and 56 secured thereon. The lever 55 has a pin 57 extending into it from a head 58 on a stem 59 that is fixed to the bar 25. The lever 56 is connected to the bar 25 by a similar head 60 and stem 61. The lever 56 has an arm 62 which extends at an angle to the portion of the lever that is fastened to the head 60. This arm 62 has a stud shaft 63 thereon which carries a roller 64 near its free end. The roller is mounted in position to be engaged by a lever arm 65 which is pivoted on a shaft 66 that is mounted on the side frame 2. The lever arm 65 is spring pressed to rotate in a clockwise direction by a spring 66' shown best in Figures 2, 3 and 10. The hand lever 49 has a stub shaft 67 thereon and this stub shaft carries a roller 68 which also engages the spring pressed arm 65. When it is desired to move the bar 25 outwardly to cause it to grasp a master sheet, the lever arm 49 is moved to the left from the position shown in Figure 22 to the position shown in Figure 23. The roller 68 engages the nose of the arm 65 and moves it out until the arm 65 engages the roller 64. This causes the roller 64 to rock the bell crank lever 56 and the shaft 63 in a direction to move the clamping bar 25 upwardly. The clamping bar can be closed by returning the lever 49 to its original position, there being springs 69 and 70 engaging the heads 58 and 60 and under compression tending to close the bar 25.

In Figures 35, 36 and 37 of the drawings a slightly modified form of master sheet clamp is shown. According to this modified form, the mechanism on the drum remains the same, but instead of the lever arm 65 a lever arm 71 is provided. The lever arm 71 is so constructed as to engage the roller 68 on the hand lever 49, but when it is moved into the gripping bar opening position, it establishes a stop at 72 for the roller 64 to prevent further rotation of the drum until the gripping bar is closed. It will be appreciated that either of these forms of gripper bar mechanism may be used.

The duplicating machine includes a platen roller 75 which is adapted to cooperate with the drum in applying pressure between the master sheet and the drum, and a copy sheet fed between the drum and the platen roller. The platen roller 75 is provided at its opposite ends with two mounting members 76 and 77 in the form of channelled rings that are adapted to rest in semi-circular cradles 78 and 79. These cradles are carried by shafts 80 and 81 (Figure 12), the shafts 80 and 81 being secured in the side frames 1 and 2 and extending beyond the cradle members 78 and 79 to provide mounting pins 82 and 83 for a receiving tray 84. The cradle members 78 and 79 are held in place by nuts 85 and 86 on the shafts 80 and 81.

The cradle members carry supporting arms 87 and 88 for a counter roller 89 that cooperates with the moistening roller 90 for moistening the copy sheets. Arms 87 and 88 are pivoted to the cradle members 78 and 79 by pivot pins 91 and 92. The pin 91 is shown in Figure 4 of the drawings and the pin 92 is shown in Figure 3 of the drawings. The members 78 and 79 are provided with small pins 93 and 94 which fit into enlarged openings 95 and 96 that are provided in the arms 87 and 88. This enables me to provide a limited amount of adjustment of the arms 87 and 88 about the pivots 91 and 92. However, any substantial movement of the members 78 and 79 causes a similar movement of the arms 87 and 88. In order to yieldingly press the counter roller 89 against the moistening roller 90, I provide a spring 97 which is between the cradle member 79 and an extension 88a on the arm 88. A similar spring 98 is provided between a similar extension 87a and the cradle member 78. The extensions 87a and 88a are notched so that the leverage of the springs 97 and 98 may be adjusted.

The cradle members 78 and 79 have suitable ears provided thereon to mount a pair of pins 99 and 100 to which the lower ends of the springs 97 and 98 are secured. These cradle members extend downwardly beyond the pins 99 and 100 where they are connected together by a cross bar 101 (see Figures 2 to 5 inclusive). Cross bar 101 is U-shaped in cross section, but it has end extensions 102 and 103 from the back portion thereof. Each of the members 78 and 79 has a keyhole slot 104 in the end thereof and the extensions 102 and 103 are notched as indicated at 105 and 106 so that they can be engaged in the keyhole slot and then given a turn to thereafter remain securely connected to the members 78 and 79. The cross bar 101 is connected to means for applying more or less pressure through the cradle member 79 to the impression roller 75. The connection is best illustrated in Figures 2 to 5 inclusive. A threaded block 107 is mounted in the U-shaped cross bar 101 at a point midway between its ends. The block is provided with two bosses 108 and 109 that extend into apertures provided in two mounting plates 110 and 111 that are riveted to the interior side walls of the cross bar 101. A threaded rod 112 is threaded through the block 107 and is rotatably but non-slidably mounted in a connector 113 which has a bifurcated end 114. The rod 112 is locked in a desired adjusting position by a lock nut 115 which can be adjusted with respect to the block 107. The end of the rod 112 is slotted as indicated at 116 to receive a screw driver. The connector 113 couples the rod 112 to a lever arm 117. The lever arm 117 is fixed to a shaft 118 that is journaled in a bearing 119 carried by an angle iron 120 that is mounted on the cross tie 3. The shaft 118 is eccentrically connected to the lever 117 by a head 121 that is pinned on the shaft and provided with an eccentric portion 122. Thus it is possible by rotating the shaft 118 to cause a direct endwise movement of the lever 117, the connector 113 and the rod 112 so as to swing the cradle members 78 and 79 about their pivot. This provides for adjustment of the tension or pressure between the platen roller 75 and the drum but does not materially affect the pressure between the moistening rollers which is generally determined by the strength of the springs 97 and 98.

The shaft 118 projects through the side frame 2, and between the side frame and its cover 17 the shaft has an indexing member 123 keyed thereon. The indexing member cooperates with a plate 124 that is fixed on the side frame 2. The indexing member has a semi-circular slot 125 therein (see Figure 8). There is a pin 126 mounted on the plate 124 and extending into the slot 125. The indexing member also carries a spring pressed ball 127 which is adapted to snap into and out of anyone of the series of apertures 128 that are arranged circumferentially around the upper half of the plate 124. The hub of the member 123 extends out substantially to the cover 17. A handle 129 is fastened on the end of the shaft 118 by a screw and it is interlocked with the hub of the member 123 by a pin and slot connection shown at 130. Suitable indicating means are printed upon the side of the cover 17.

Figures 3, 4 and 5 of the drawings illustrate how the mechanism comprising the cross bar 101 and the members 112, 114 and 117 may be used to release the two rollers 75 and 89 from any pressure and swing them free far enough so they can be readily removed from their cradles. The lever 117 as shown is provided with a hand piece 131 by which the lever can be rocked from the position shown in Figure 3 to that shown in Figure 4. A spring 132 is connected to the lever 117 by a pin 133 and the other end of the spring is connected at 134 to the cross bar 3. The spring is under tension so that when the lever is in the position shown in Figure 3 the spring tends to pull the lever down and holds its tip portion 117a against the connector 113. By using the hand piece 131 the operator can move the lever 117 to the position shown in Figure 4. In this position the spring 132 tends to retain the parts as shown in Figure 4. The lever 117 is notched at 135 to provide a shoulder on which the member 113 rests when the parts are in the position shown in Figure 4. This arrangement is particularly advantageous since it provides an easy manner of releasing the pressure on the rollers during inoperative periods of the machine and allows unskilled operators to take the rollers out for inspection and cleaning without in anyway disturbing the adjustments made for proper operations.

Referring now to the moistening mechanism: This mechanism is shown in Figures 2, 2a, 9, 11, and 13 to 21, 25 to 34 inclusive of the drawings. A modified form of the moistening mechanism is also illustrated in Figures 38 to 40 inclusive. The moistening mechanism shown in Figures 25 to 34 is a different moistening mechanism from that shown in the main form of the invention, there being only the moistening roller and its counter roller in this form of the invention. A combined spreader and moisture delivery member is utilized to moisten the moistening roller from a tank which delivers the moistening liquid by gravity.

The moistening mechanism shown in Figures 38, 39 and 40 has certain features that are shown in the main form of the invention but it has a gravity feed device of a general nature similar to that shown in Figures 25 to 34 inclusive with certain modifications made to adapt the device to the trough conception of moistening which is the subject matter of the Marchev Patent No. 2,264,578 and the Kokay Patent No. 2,267,982. The moistening roller 90 which has been referred to hereinbefore is mounted for removal in position directly over the counter roller 89. The construction and mounting of the moistening roller 90 is best illustrated in Figure 17. The roller comprises a shell portion 136. This shell may be of any suitable resilient material or of a hard material, if desired. I preferably make the shell 136 in accordance with the teachings of the Kokay patent referred to above. The shell 136 is mounted upon a core 137 of metal. This core also serves as a mounting for two end seal discs 138 and 139 which are free to move endwise of the core 137 but are prevented from rotating with respect to the core by tongues 140 and 141 on the discs 138 and 139 and corresponding grooves 142 and 143 in the core 137. The opposite ends of the core are threaded to receive clamping nuts 144 and 145. The clamping nut 144 clamps a spring shoe 146 against the disc 138. The shape of the shoe 146 is shown best by reference to Figure 14 where a like shoe 147 that is clamped in place by the nut 145 is shown. As shown best in Figures 17 and 19 there is a lock member 148 between the nut 144 and the shoe 146 that is adapted to lock the core 137 to a flange 149 of a drive member 150 that rotates the moistening roller 90. The member 148 has a tongue 151 extending into the groove 142 of the core 137 and it has a horizontally extending lug 152 engaging in a notch 153 of the flange 149. The nuts 144 and 145 are locked in position after being tightened by two lock washers 154 and 155. These lock washers have tongues fitting into the groove 142 of the core 137 and having projecting lugs 156 and 157 thereon that are bent up along side the nuts 144 and 145 after the nuts are tightened to prevent rotation thereof.

In order to mount the moistening roller 90 in the side frames 1 and 2, two bearings 158 and 159 are fastened in the side frames. The drive member 150 is mounted in the bearing 158, a bushing 160 being used to provide lubrication. A similar bushing 161 is used in the bearing 159 to mount an elongated collar 162 that is fastened to a rod 163 by a pin 164. The bushings sold under the name "Oilite" are suitable for the bushings 160 and 161. The collar 162 has a groove 165 therein and the bearing 159 has a slot 166, the slot extending through the bushing 161. A retainer clip 167 secures the collar 162 in the position shown in Figure 17. The rod 163 extends all the way through the core 137 and into the drive member 150 which is provided with a recess 168 for the rod. The rod has a head 169 secured thereto, the head being extended outside of the cover 17. It will be evident from the foregoing description that the roller 90 can be completely released from any connection with the frame or the drive mechanism of the machine by withdrawing the rod 163. The clip 167 will ride out of the groove 165 upon a sharp pull on the rod.

The particular driving mechanism for the roller 90 comprises a gear 170. This gear 170 is rotatably mounted on a reduced portion 171 of the member 150 and is connected by a one-way clutch 172 to the portion 171. The details of this one-way clutch forms no part of the present invention, but they are described more fully in a copending application by Eric W. Peterson and myself for Sheet Feeding Means for Duplicating Machines, Serial No. 573,412 filed January 18, 1945. The arrangement of the clutch 172 is such that if the gear 170 is rotated in such a direction as to cause the roller 90 to turn in a counter clockwise direction as indicated by the arrow in Figures 3 and 13, the roller is driven with the gear, but if the gear is turned in the opposite direction, then it may turn freely without disturbing the roller. Also if the gear is held stationary the roller can move in the direction indicated by the arrow in Figure 3 independably of the gear.

Figures 2, 2a and 10 illustrate the mechanism by which the gear 170 is rotated. The mechanism comprises the cam 45 and the main shaft 28 of the drum, a lever 173 which is pivoted at its upper end to the side frame 1 and which has a roller 174 thereon riding on the cam 45. The lever arm 173 has gear teeth 175 in a laterally projecting segment 176 thereof. The teeth 175 engage the gear 170 so that as the cam pushes the arm 173 to the right as shown in Figure 2a the segment 176 rotates the gear 170 in such a direction as to cause the moistening roller 90 to advance the copy sheet to the drum 23. A spring 177 is connected to the arm 173 so as to hold the cam roller 174 against the cam 45.

A spreader roller 180 is mounted for cooperation with the roller 90. This roller is of rubber or a similar resilient material. The spreader roller 180 should be harder than the moistening roller 90. The roller 90 has the end seals 138 and 139 pressed securely against its ends so that they will rotate with the roller. In practice the roller is made just a trifle shorter than roller 180 so that there will be a very close fit between the end seals and the ends of the roller 180 with which they have frictional contact. The roller 180 has its ends finished very smooth to reduce possibility of leakage. If any wear takes place, the roller 90 is soft enough that the end seals can be moved toward each other enough to compensate for the wear. The roller 180 may desirably have its surface roughened. The spreader roller 180 is mounted in two bearings 181 and 182 that are in turn slidably mounted in two slots 183 and 184 of a removable cover member 185. There is a cross bar 186 mounted in the side frames 1 and 2. This cross bar 186 is rectangular in cross section (see Figures 13–17), and it is adapted to mount a spray tube 187 and a suction tube 188 by which liquid is sprayed into the trough between the rollers 90 and 180 and withdrawn for each cycle of operation of the machine. The bar 186 also serves to support the roller 180 when the cover 185 is removed. The details of this construction are shown in Figures 13 to 18 inclusive. According to Figure 16 the bar 186 has spaced clips 189 and 190 fastened thereto by screws 191. The clips 189 and 190 are welded to the tubes 187 and 188 so as to carry these tubes from the bar 186. The clips 189 and 190 also carry a splash shield 192 that directs the liquid from the spray tube 187 into the trough of the rollers 90 and 180. These clips also carry another splash shield 193 which projects over the roller 90 between it and the drum 23.

The tube 188 must be positioned as low in the trough of the rollers 90 and 180 as possible. I find that I can get the inlets to the tube down close to the bottom of the trough between the rollers by providing spaced cups 194 that are welded to the under surface of the tube 188 and tapered so as to extend down close to the bottom of the trough between the rollers. The particular construction of the cups 194 may be varied over a wide range. The essential feature is that they remove existing liquid from the trough so that there will be less tendency for moisture left between the rollers to escape around the end seals 138 and 139. Figure 15 shows how these end seals bear directly against the polished ends of the roller 180. Apertures 195 are provided in each of the cups 194. The tube 187 has spray openings 197 therein at spaced intervals throughout its length so as to deliver a spray of liquid downwardly into the trough between the rollers 90 and 180.

The cover 185 has two channels 198 and 199 in its opposite ends (see Figure 18). These channels are engaged by guide bars 200 and 201 that are mounted on the side frames 1 and 2 respectively. The guide bars 200 and 201 slidably mount the cover so that it can be moved toward and away from the rollers 180 and 90. Means are provided whereby the cover 185 is latched in place to enclose the rollers. This cover also carries means for applying suitable pressure against the spreader roller 180, such means being adjustable in a manner to be described hereinafter. The cover 185 itself is a part of the mechanism for directing sheets to be moistened into the bite of the rollers 89 and 90. The guide portion of the cover consists of a diagonally extending wall 202 and a horizontally extending wall 203. A cooperating plate 204 is mounted on the cross tie bar 11 so as to form a narrow throat 205 through which the sheets are fed to the moistening rollers.

The mounting of the housing 185 is accomplished by providing two spaced spring clips 206 and 207 on the bar 186. These clips have lugs 208 and 209 thereon, the lugs being provided with vertical edges facing the bar 186 and tapered edges facing in the opposite direction. The free ends of the clips are turned down in the manner illustrated at 210 in Figure 13. The cover carries two clip releasing pins 211 and 212 and the cover also carries two clip engaging plates 213 and 214 that are adapted to hook down behind the lugs 208 and 209 to secure the cover in place. When it is desired to release the cover the pins 211 and 212 are depressed to move the spring clips 206 and 207 down far enough below the plates 213 and 214 to clear the lugs 208 and 209.

The means for applying pressure on the roller 180 comprises two headed pins 215 and 216 that are slidably mounted in bosses 217 and 218 that are cast in the cover 185. These bosses are drilled out to provide recesses 219 and 220 to receive the heads of the pins 215 and 216 and to receive springs 221 and 222 which bear against the heads of the pins. The ends of the pins extend into the slots 183 and 184 that receive the bearings 181 and 182. Screws 223 and 224 are provided for adjusting the tension of the springs 221 and 222. The showing in Figure 14 clearly illustrates how pressure is applied to the bearings 181 and 182 to urge the roller 180 against the roller 90.

The bearings 181 and 182 of the roller 180 have to be supported when the cover is removed. I provide means for supporting these parts from the bar 186 (see Figures 15 and 18). This means comprises two spring clips 225 and 226 which have their upper ends turned parallel to the bar 186 as shown at 227 and 228 and secured to the bar by screws. The lower ends of these clips are apertured to receive the opposite ends of a shaft 229 of the roller 180. When the cover 185 is removed, clips 225 and 226 hold the roller 180 and its bearings in place, but they can be readily released by swinging out beyond the shaft 229 and then of course, there is no difficulty in removing the roller 90.

The means for supplying liquid to the tube 187 and drawing it out through the tube 188 comprises a twin pump unit 230 which is in communication with the liquid tank 20 that is mounted between the side frames 1 and 2 (see Figures 9 and 11). This pump unit comprises two pump cylinders 231 and 232, a cross head 233 operating pistons in both cylinders, and a common drive member 234 that actuates both of the pumps from the cam 41 that is fastened on the drum shaft 28. The mechanism for actuating the pumps from the drum shaft comprises a bell crank lever 235 which is pivoted to the side wall 1 by a stub shaft 236. The bell crank lever 235 carries a roller 237 at one end engaging the cam 41 and it carries a spring 238 at its other end, the spring being under tension to hold the roller 237 against the cam 41. The pump unit 230 is set right in the side frame 1, the side frame being cut out to receive the pump as illustrated best in Figure 11. There is a cam roller 239 extending through an aperture 240 in the side frame 1 to engage the spring carrying end of the bell crank lever 235. The cam roller is carried by a lever 241 which is pivoted to the side frame 1 at 242 and which has its other end bifurcated to receive the upper reduced end portion of the member 234. Bearing means 243 are provided on the member 234 for the free end of the lever 241. A spring 244 is coiled around the hub of the lever 241 and connected between a pin 245 on the side frame 1 and the lever 241 in such fashion as to tend to hold the cam roller 239 against the bell crank 235.

The tank 20 is connected to the pump 232 by a flexible tube 246. Another tube 247 leads from the pump 232 to the spray tube 187. The suction tube 188 is connected by a flexible tube 248 to the inlet of the pump 231. The outlet of this pump is connected by another flexible tube 249 to the tank 20. The tank 20 may of course, have any suitable strainer mechanism therein as may be desired for maintaining solvent liquid in proper condition. Such devices however, form no part of my invention and therefore, have not been described.

Referring now to Figures 25 to 34 inclusive, in this form of the invention, the construction of the moistening mechanism is quite different from that shown in the main form of the invention. Two side frames 1 and 2 are slotted as indicated at 251 and 252 to receive supporting pins 253 and 254 that are provided at the opposite ends of a liquid container 255. This liquid container desirably is a casting of a suitable light metal or plastic. It has a cover 256 and a sealing gasket 257 beneath the cover. The sealing gasket preferably extends over the entire bottom surface of the cover except where it is apertured at 258 in Figure 33 and at 259 in Fig. 25.

The receptacle 255 has provided at its lower end an elongated projecting rib 260 which has a rubber boot 261 fastened thereto by a series of bolts 262. The rubber boot 261 is covered on its back side by a metal strip 263 shaped to correspond to the boot. At its front side the rubber boot is partially covered by a down turned flange 264 on a splash guard 265 that is also held in place by the bolts 262. These bolts are threaded into nuts 266 which are held against the rotation by the splash guard 265. The rubber boot has its end portions provided with two flanges 267 and 268, these flanges being adapted to closely engage a moistening roller 90'. The moistening roller 90' cooperates with a counter roller 89' to moisten copy sheets that pass between them in the manner illustrated in Figures 25 and 27. It is the function of the rubber boot 261 to engage the roller 90' and form a trough therewith as illustrated at 269 in Figures 25 and 27. This trough is closed at its ends by the flanges 267 and 268. The slope of the bottom of the boot 261 is opposite to the slope of the bottom of the rib 260 so as to form a liquid pocket 270 between the boot and the rib along the bottom face of the rib. This liquid pocket is in communication with the trough 269 through a pair of apertures 271 and 272. These apertures act as means to limit the rise of liquid in the trough 269 as will be explained more fully hereinafter.

In order to hold the boot against the roller 90' so as to form a good seal therewith I mount the receptacle 255 in such a fashion that it is spring pressed against the roller 90' under a variable control which will now be described. The supporting pins 253 and 254 have head portions 273 and 274 that are provided with horizontally extending arms 275 and 276. These arms are in turn connected by springs 277 and 278 to a pair of links 279 and 280. The links 279 and 280 are engaged with the headed upper ends 281 and 282 of two screws 283 and 284. These screws are threaded into a pair of lugs 285 and 286 that are mounted on the side frames 1 and 2. Figure 26 of the drawings illustrates how the tension of the springs 277 and 278 exerts a leverage through the arms 275 and 276 tending to swing the vessel about its support and thus bring the boot 261 against the roller 90'. The supporting pins 253 and 254 do not extend all the way down to the bottom of the slots 251 and 252. The head portions 273 and 274 are carried on two screws 287 and 288 that are threaded into two lugs 289 and 290 that are riveted to the side frames 1 and 2. In originally mounting the device the necessary adjustments are of course made to force the boot 261 against the roller 90' with the proper tension. Once this is done it is not necessary to make any adjustment of the parts just described.

The means for controlling flow of liquid into the boot 261 comprises a valve mechanism that is shown best in Figures 25, 28, 29 and 33. There is a valve boss 291 formed in the bottom of the container 255. This boss is provided with a bore 292 into which a valve 293 extends. There is a port 294 in the boss 291 near the bottom of the container 255. The valve 293 has a recess 295 in the bottom thereof and this recess opens on to the side of the valve by an opening 296 in the side wall of the recess. The bore 292 extends far enough below the port 294 to allow the valve 293 to seal off the port 294 when it is rotated a quarter turn from the position shown in Figure 33. There is a passage 297 extending from the bottom of the bore 292 through the rib 260 and into the chamber 270.

The valve 293 extends upwardly through a sleeve 298 that engages the top surface of the boss 291. The top surface of the boss 291 is notched as shown at 299 and the sleeve 298 has teeth 300 (see Figure 32) engaging in the notches to normally prevent rotation of the sleeve 298 with respect to the boss. The sleeve 298 at its top edge is provided with two oppositely disposed slots 301 and 302 in which a pin 303 in the valve 293 rests. The valve has a stem portion 304 that extends up through the cover 256, but there is a flange 305 directly beneath the cover and the cover is thickened as indicated at 306 directly over the flange. There is a spring 307 interposed between the flange 305 and the sleeve 298, the spring being under compression to oppose rotation of the sleeve 298 and the valve stem because of the pressure of the spring urging the teeth 300 in the notches 299.

The flange 305 is in itself another valve that cooperates with an inlet opening 308 that is provided in the cover 256. This inlet opening is adapted to be registered with an opening 309 in the flange 305 by rotation of the stem 304 through an arc of 180 degrees from the position shown in Figure 33. Means are provided to limit the rotation of the stem 304 to an arc of 180 degrees so that it is impossible for the parts to be placed in the wrong position by confusing the marking. These means comprise a slot 310 in the cover 256, the slot being semi-circular about the axis of the valve stem as a center, and a pin 311 on the flange 305.

In operation the valve stem is turned to the "fill" position as indicated in Figure 29 by means of a hand piece 312 provided thereon and is filled with a suitable moistening fluid. By turning the valve stem to off position by a quarter turn, the container remains sealed because the openings 294 and 296 are not registered with each other. When the operator wants to deliver liquid to the boot 261, he turns the valve to "on" position so as to align the openings 294 and 296. This allows the liquid to flow in the space 270 and into the trough 269 until the liquid covers the openings 272. At this level there is no opportunity for air to get into the vessel 255 so there is no further passage of liquid out of the vessel until the liquid in the trough 269 is used up to a sufficient extent to allow air to bubble up into the vessel through the openings 272 and the passage 297. In this way I am able to obtain a fairly adequate control of liquid.

Referring now to Figures 25, 26 and 33, these figures illustrate how the counter roller 89' is held in place in this modified form of the invention. We have not described the mounting of the moistening roller, but the mounting utilized in the main form of the invention is equally applicable here or any other desired mounting such as that shown in the prior patents hereinbefore mentioned may be used for the moistening roller. The counter roller has two sleeves 313 and 314 on the extended portions of its shaft. These sleeves as shown extend into the side frames 1 and 2 which are slotted as shown at 315 in Figure 26. The side frames are also strengthened by two rectangular plates 316 and 317 which are riveted to the inner surfaces of the side frames. In order to maintain the proper pressure of the roller 89' against the moistening roller, I provide laterally extending tabs 318 and 319 on the plates 316 and 317 and these tabs carry tubular supporting pins 320 and 321 that are threaded into the tabs. The supporting pins are hollow to receive two plungers 322 and 323 that have heads thereon engaging the sleeves 313 and 314. The sleeves are notched in the lower surface thereof (see Figure 33) at 324 to provide a seat for the cone shape ends of the headed plungers. The plungers are surrounded by springs 325 and 326, the tension of which may be adjusted by adjusting screws 320 and 321 so as to vary the pressure of the roller 89' against the moistening roller.

Referring now to Figures 38 to 40 inclusive. In this form of the moistening mechanism the same roller arrangement is used that is used in the main form of the invention for moistening the copy sheets. That is the rollers 89'', 90'' and 180'' are the same as the rollers employed in the main form of the invention. There is however, a somewhat different arrangement for mounting the roller 180'' and the moistening arrangement has been changed. The bar 186' serves as a mounting means for a frame work 330 that is composed of two horizontal bars 331 and 332 adjacent the opposite ends of the bar 186'. The bars 331 and 332 have upwardly extending portions 333 and 334 at the ends next to the drum. At the other end of each bar there is a plate 335 to hold a liquid receptacle 336 on the bars. The liquid receptacle carries its own spray tube 337. The spray tube 337 is connected by a pipe 338 and a nipple 339 to the bottom of the receptacle. An inverted channel member 340 is also carried by the receptacle 336. This inverted channel is closed at its ends and has a narrow slot 341 opening downward into the trough between the moistening roller 180'' and the roller 90''. The inverted channel is in communication with the top of the receptacle 336 by means of a pipe 342. The receptacle 336 is sealed air tight. The inverted channel member 340 extends down as far as it is practicable into the trough between the rollers, but it has been found that it is impossible to operate such a device and to use up the liquid because of the tendency of the inverted channel or a tube having openings on the bottom thereof to become clogged or shutoff by globules of liquid around the openings. This persisting of the liquid in hanging around the inlet and preventing air from breaking the vacuum in the container of the liquid has been overcome in the present case by attaching a thin sheet 343 of rubber between the face of the inverted channel and the bottom of the trough and slotting the edge of the sheet that projects downward from the channel. The slotted edges 344 of the rubber sheet 343 extend down beyond the channel into engagement with one of the rollers 90'' or 180''. I find that with this construction the capillary action between the roller and the portions 344 of the rubber sheet will rid the vent nozzle 341 of the accumulated globules of liquid very quickly after the liquid is used up. This allows passage of air smoothly and uniformly into the container so that liquid is supplied steadily to the moistening rollers in response to the demand for liquid.

The sheet feeding mechanism by which sheets are fed to the duplicating machine while being shown generally herein will not be described in detail since it forms a joint invention of myself and Eric W. Peterson upon which a separate application hereinbefore referred to is being filed. The sheet feeding mechanism comprises a feed tray 345 which has an inverted pan shape base 346, both ends of which are provided with apertures 347 to receive pins 348 that are carried by the cross bar 11. These pins serve to position one end of the feed tray. There are supporting pins 349 provided on the side frames 1 and 2 to receive the side edges of the feed tray. Also the feed tray is latched in position by a pin 350 on one side flange of the feed tray and a pivoted latch 351 which is carried on the side frame 1. This latch is spring pressed by a spring 352 into upright position where it can engage the pin 350. A sheet feeding mechanism embodying a feed roller 353 is adapted to be actuated from the drum by the cam 44, a lever 354, a link 355 and a rack 356. The details of the mechanism however, are described more fully in the co-pending application referred to above.

The sheet receiving tray of the machine was previously referred to in describing the mounting of this tray upon the pins 82 and 83. This tray is adjustably supported by two notched brackets 357 and 358 which are mounted on the side frames 1 and 2 by posts 359 and 360. The receiving tray carries an adjustable stop 361 which can be moved in or out to accommodate all different lengths of copy sheets.

The machine is provided with a counting device that is actuated by the roller 64 on the end of the drum to record the number of copies made. This counting device comprises a bearing block 362 in the side frame 2, a shaft 363 journalled in the block, an arm 364 on the shaft and engageable by the roller 64, an arm 365 on the other end of the shaft, a pawl 366 pivoted on the arm 365 and a toothed wheel 367 engaged by the pawl 366. There is a stop pin 368 on the frame 2 for the arm 365. A spring 369 holds the arm 365 and the pawl 366 in proper position and serves also to return them to starting position after each actuation by the drum. The ratchet wheel 367 is carried by a bearing sleeve 370, which is journalled on a stub shaft 371 that is mounted on the frame 2. The wheel 367 has an indicating dial 372 thereon. This dial is provided with a bevelled edge 373 upon which the numbers are provided. There is an opening 374 in the cover 17 through which a stem 375 on the dial 372 is extended. The stem can be used to set the counter. In devices of this sort it is customary to set the counter dial at the number representing the copies desired and then to operate the machine until the zero mark on the dial is reached. That is why the numbers on the dial are marked as indicated on the drawings. A window opening 316 is provided in the cover 17.

In order to indicate by sound that the indicator dial has reached zero a bell 377 is provided on the frame 2. A striker 378 is pivoted on the frame 2 by a pivot pin 379. The striker is held in neutral position by a spring 380. The spring 380 is anchored to the frame 2 by a post 384. The striker has an arm 381 to which the spring is secured. The spring is under tension. The striker has another arm 382 which is adapted to engage a projection 383 struck up from the wheel 367. The projection 383 engages the arm 382 as the dial approaches zero position and moves the striker 378 away from the bell 377, increasing the tension on the spring 380. Then when the zero position of the dial is reached the projection 383 moves off the arm 382 to allow the energy stored in the spring 380 to swing the striker against the bell. In order to prevent reverse movement of the ratchet wheel 367, a spring latch 385 is mounted on the side frame 2.

From the foregoing description it is believed that the nature and advantages of my invention will be clear to those skilled in this art.

Having thus described my invention, I claim:

1. In a duplicating machine, a drum, a platen roller operable to press sheets against the drum, a moistening roller mounted to rotate about a fixed axis, a counter roller, a common supporting means for said platen roller and said counter roller, means for mounting said counter roller on said supporting means for movement toward and away from said moistening roller, resilient means mounted to urge said counter roller yieldingly toward said moistening roller, said supporting means being movable between two limiting positions in one of which the platen roller and the counter roller are pressed against the drum and the moistening roller and in the other of which the platen roller and counter roller are completely separated from the drum and moistening roller.

2. In a duplicating machine, a drum, a platen roller operable to press sheets against the drum, a moistening roller mounted to rotate about a fixed axis, a counter roller, a common supporting means for said platen roller and said counter roller, means for mounting said counter roller on said supporting means for movement toward and away from said moistening roller, resilient means mounted to urge said counter roller yieldingly toward said moistening roller, said supporting means being movable between two limiting positions in one of which the platen roller and the counter roller are pressed against the drum and the moistening roller and in the other of which the platen roller and counter roller are completely separated from the drum and moistening roller, and manually operable means including a spring pressed toggle, for moving said supporting means from either position to the other.

3. In a duplicating machine, a drum, a platen roller operable to press sheets against the drum, a moistening roller, a counter roller operable to press sheets against the moistening roller, a common supporting means for said platen roller and said counter roller, said supporting means being movable between two limiting positions in one of which the platen roller and the counter roller are pressed against the drum and the moistening roller and in the other of which the platen roller and counter roller are completely separated from the drum and moistening roller, said common supporting means including movable arms carrying said platen roller, arms movably mounted on the first named arms and carrying the counter roller, and means urging said movably mounted arms in a direction to hold said counter roller in cooperative relation with said moistening roller.

4. In a duplicating machine, a drum, a platen roller operable to press sheets against the drum, a moistening roller, a counter roller operable to press sheets against the moistening roller, a common supporting means for said platen roller and said counter roller, said supporting means being movable between two limiting positions in one of which the platen roller and the counter roller are pressed against the drum and the moistening roller and in the other of which the platen roller and counter roller are completely separated from the drum and moistening roller, said common supporting means including arms carrying said platen roller, means mounting said arms for movement in unison, arms pivoted on the first named arms and carrying the counter roller on the ends thereof, and spring means tending to swing said ends of said last mentioned arms toward the moistening roller.

5. In a duplicating machine, a drum, a platen roller operable to press sheets against the drum, a moistening roller, a counter roller operable to press sheets against the moistening roller, a common supporting means for said platen roller and said counter roller, said supporting means being movable between two limiting positions in one of which the platen roller and the counter roller are pressed against the drum and the moistening roller and in the other of which the platen roller and counter roller are completely separated from the drum and moistening roller, said common supporting means including pivoted arms carrying said platen roller, arms movably mounted on the first named arms and carrying the counter roller, a cross bar spaced from said pivots connecting said two first named arms to move in unison about their pivots, a toggle having one end secured to the cross bar, a shaft, an eccentric fixed thereon, the other end of the toggle being pivoted on said eccentric, and manual means to position said shaft in different angular positions.

6. In a duplicating machine, a drum, a platen roller operable to press sheets against the drum, a moistening roller, a counter roller operable to press sheets against the moistening roller, a common supporting means for said platen roller and said counter roller, said supporting means being movable between two limiting positions in one of which the platen roller and the counter roller are pressed against the drum and the moistening roller and in the other of which the platen roller and counter roller are completely separated from the drum and moistening roller, said common supporting means including pivoted arms carrying said platen roller, arms movably mounted on the first named arms and carrying the counter roller, a cross bar spaced from said pivots connecting said two first named arms to move in unison about their pivots, a toggle having one end secured to the cross bar, a shaft, an eccentric fixed thereon, the other end of the toggle being pivoted on said eccentric, spring means connected to said toggle for urging it to either folded or straight position, and manual means to position said shaft in different angular positions.

7. In a duplicating machine, a drum, a platen roller operable to press sheets against the drum, a moistening roller, a counter roller operable to press sheets against the moistening roller, a common supporting means for said platen roller and said counter roller, said supporting means being movable between two limiting positions in one of which the platen roller and the counter roller are pressed against the drum and the moistening roller and in the other of which the platen roller and counter roller are completely separated from the drum and moistening roller, said supporting means comprising arms movable to advance the platen and counter rollers, a cross bar connecting said arms to move the same in unison, a toggle having one end connected to the bar at a point to hold said arms in a position with said counter roller and platen roller in sheet pressing position when extended, means pivotally and adjustably mounting the other end of the toggle, and spring means for holding said toggle in extended or folded position.

8. In a duplicating machine, a framework comprising spaced side frames and cross ties connecting said frames, a shaft journalled in said side frames, a drum fixed on said shaft, a platen roller, means movably mounted on said side frames to carry the platen roller into and out of operative engagement with the drum, and combined cooperating feeding and moistening rollers each of substantially the width of said drum for feeding copy sheets to the drum and moistening a surface of each sheet as it is fed, one of said last named rollers being mounted on the platen roller carrying means, for limited movement toward and away from the other roller, and the other of said rollers being mounted on said side frames for rotation about a fixed axis.

9. In a duplicating machine, side frames, a drum rotatably mounted thereon, a platen roller mounted on said side frames, in engagement with the drum, combined feeding and moistening rollers mounted on said side frames in position to feed copy sheets to the drum and platen roller, drive means for said drum and rollers, and means to moisten one of said combined feeding and moistening rollers comprising a liquid supply tank between said side frames, a spray tube operable to supply liquid to the moistened roller, a spreader engaging the moistened roller and forming a trough therewith, a suction tube in said trough, a pump drawing liquid from said tank and delivering it to said spray tube, a second pump drawing liquid from said suction tube and delivering it to the tank, and means operably connecting said pumps to said drive means comprising common operating means for both of said pumps, one of said side frames comprising a plate having an aperture therein said pumps having a common mounting positioned in the aperture, said mounting having portions embracing and secured to said side frame adjacent said aperture to mount said pumps on said side frame.

10. In a duplicating machine, side frames, a drum rotatably mounted thereon, a platen roller mounted on said side frames, in engagement with the drum, combined feeding and moistening rollers mounted on said side frames in position to feed copy sheets to the drum and platen roller, drive means for said drum and rollers, and means to moisten one of said combined feeding and moistening rollers, the moistened roller having a rigid core and a resilient rubber covering, the core extending beyond the covering at the ends, end seal discs on said core, and resilient members pressing said discs against the ends of said covering.

11. In a duplicating machine, a drum, a platen roller, combined feeding and moistening rollers for moistening and advancing sheets to the drum, and means to moisten one of said combined rollers including a separate roller engaging the moistened roller, support means supporting said separate roller for ready removal, means supporting said roller to be moistened for ready removal, and a cover for the removable rollers comprising a shell having a bottom portion adapted to guide sheets to the combined rollers, said shell having springs therein and said separate roller having bearing blocks thereon guided by said shell to said springs whereby to press the separate roller yielding against the moistened roller.

12. A readily removable moistening roller assembly for duplicating machines having a framework and having a drum and platen and counter rollers therein, said assembly comprising a moistened roller, means carried by the framework for delivering moistening liquid on the moistened roller, a separate roller engaging the moistened roller, support means supporting said separate roller for ready removal, means supporting said roller to be moistened for ready removal, and a cover for the removable rollers comprising a shell having a bottom portion adapted to guide sheets to the combined rollers, said shell having springs therein and said separate roller having bearing blocks thereon guided by said shell to said springs whereby to press the separate roller yielding against the moistened roller.

13. A moistening roller assembly for duplicating machines having a framework and having a drum and platen and counter rollers therein, said assembly comprising a moistened roller, said framework including a cross bar adjacent to and above the moistening roller, means including a spray tube for delivering moistening liquid on the moistened roller, a separate roller engaging the moistened roller, support means supporting said separate roller for ready removal, means supporting said roller to be moistened for ready removal, and a cover for the removable rollers comprising a shell having a bottom portion adapted to guide sheets to the combined rollers, said shell having springs therein and said separate roller having bearing blocks thereon guided by said shell to said springs whereby to press the separate roller yielding against the moistened roller.

14. A moistening roller assembly for duplicating machines having a framework and having a drum and platen and counter rollers therein, said assembly comprising a moistened roller, said framework including a cross bar adjacent to and above the moistening roller, means including a spray tube for delivering moistening liquid on the moistened roller, a separate roller engaging the moistened roller, support means supporting said separate roller for ready removal, means supporting said roller to be moistened for ready removal, and a cover for the removable rollers comprising a shell having a bottom portion adapted to guide sheets to the combined rollers, said shell having springs therein and said separate roller having bearing blocks thereon guided by said shell to said springs whereby to press the separate roller yielding against the moistened roller, said framework having guides supporting the shell for sliding movement into and out of operative position adjacent to said rollers, and latch means for latching the shell in operative position.

15. A moistening roller assembly for duplicating machines having a framework and having a drum and platen and counter rollers therein, said assembly comprising a moistened roller, said framework including a cross bar adjacent to and above the moistening roller, means including a spray tube for delivering moistening liquid on the moistened roller, a separate roller engaging the moistened roller, support means supporting said separate roller for ready removal, means supporting said roller to be moistened for ready removal, and a cover for the removable rollers comprising a shell having a bottom portion adapted to guide sheets to the combined rollers, said shell having springs therein and said separate roller having bearing blocks thereon guided by said shell to said springs whereby to press the separate roller yielding against the moistened roller, said framework having guides supporting the shell for sliding movement into and out of operative position adjacent to said rollers and said bar having manually releasable latch means thereon cooperating with said shell to hold the shell in operative position.

16. In a duplicating machine, a framework, a drum journalled for rotation therein, a platen roller operable to press sheets against the drum, combined feeding rollers operable to feed copy sheets to said drum, cradles rotatably supporting the platen roller and one of said feeding rollers, means mounting said cradles for movement together in a direction to separate the platen roller and said feeding roller from the drum and the other feeding roller whereby they may be readily removed from the machine, and a rod slidably endwise in and releasably connected with the framework and slidable endwise in the other feeding roller upon release from said framework to removably support said other feeding roller for rotation about a fixed axis.

17. In a duplicating machine, a drum, a platen roller, a moistening roller mounted to rotate about a fixed axis, a counter roller cooperating with said moistening roller, supporting means for said platen roller movable between two alternative positions, supporting means for said counter roller mounted on said platen roller supporting means for limited movement relative thereto in a direction to move said counter roller toward and away from said moistening roller, and means for holding said platen roller supporting means in a position with said platen roller in position to press sheets against said drum and said counter roller in position to press sheets against said moistening roller.

18. In a duplicating machine, a drum, a platen roller, supporting means for said platen roller movable between a position in which said platen roller presses sheets against said drum and a position in which said platen roller is spaced from said drum, a moistening roller, a counter roller, supporting means for said counter roller mounted on said platen roller supporting means for movement relative thereto, means urging said counter roller toward said moistening roller, means for holding said platen roller supporting means in said first position, and means for moving said holding means out of holding position, said platen roller supporting means moving to said second position upon movement of said holding means out of holding position, said counter roller supporting means being mounted to move into a position in which said counter roller is spaced from said moistening roller upon movement of said platen roller supporting means to said second position.

19. In a duplicating machine, a drum, a platen roller, a moistening roller, a counter roller cooperating with said moistening roller, supporting means for said platen roller movable between two alternative positions, supporting means for said counter roller mounted on said platen roller supporting means for movement relative thereto, means yieldably urging said counter roller toward said platen roller, and means for holding said platen roller supporting means in a position with said platen roller in position to press sheets against said drum and said counter roller in position to press sheets against said moistening roller.

20. In a duplicating machine, a drum, a platen roller, a moistening roller, a counter roller cooperating with said moistening roller, supporting means for said platen roller movable between two alternative positions, supporting means for said counter roller mounted on said platen roller supporting means for movement relative thereto, means detachably mounting said platen roller and said counter roller on said supporting means for independent rotation, and means for holding said platen roller supporting means in a position with said platen roller in position to press sheets against said drum and said counter roller in position to press sheets against said moistening roller.

21. In a duplicating machine, a drum, a platen roller, a moistening roller mounted to rotate about a fixed axis, a counter roller cooperating with said moistening roller, supporting means for said platen roller movable between two alternative positions, supporting means for said counter roller mounted on said platen roller supporting means for limited yielding movement relative thereto in a direction to move said counter roller toward and away from said moistening roller, means for holding said platen roller supporting means in a position with said platen roller in position to press sheets against said drum and said counter roller in position to press sheets against said moistening roller, and means for moving said holding means out of holding position to space said platen roller from said drum and said counter roller from said moistening roller.

22. In a duplicating machine, a drum, a platen roller, supporting means for said platen roller movable between a position in which said platen roller presses sheets against said drum and a position in which said platen roller is spaced from said drum, a moistening roller, a counter roller, supporting means for said counter roller mounted on said platen roller supporting means for movement relative thereto, means urging said counter roller toward said moistening roller, means for adjusting said last mentioned means, means for holding said platen roller supporting means in said first position, and means for moving said holding means out of holding position, said platen roller supporting means moving to said second position upon movement of said holding means out of holding position, said counter roller supporting means being mounted to move into a position in which said counter roller is spaced from said moistening roller upon movement of said platen roller supporting means to said second position.

23. In a duplicating machine, a drum, a platen roller, supporting means for said platen roller movable between a position in which said platen roller presses sheets against said drum and a position in which said platen roller is spaced from said drum, a moistening roller, a counter roller, supporting means for said counter roller mounted on said platen roller supporting means for movement relative thereto, means urging said counter roller toward said moistening roller, means for holding said platen roller supporting means in said first position, means for adjusting said holding means to vary the pressure of said platen roller against said drum, and means for moving said holding means out of holding position, said platen roller supporting means moving to said second position upon movement of said holding means out of holding position, said counter roller supporting means being mounted to move into a position in which said counter roller is spaced from said moistening roller upon movement of said platen roller supporting means to said second position.

24. In a duplicating machine, a drum, a platen roller, supporting means for said platen roller movable between a position in which said platen roller presses sheets against said drum and a position in which said platen roller is spaced from said drum, a moistening roller, a counter roller, supporting means for said counter roller mounted on said platen roller supporting means for movement relative thereto, resilient means urging said counter roller toward said moistening roller, means for adjusting the tension of said resilient means, means for holding said platen roller supporting means in said first position, means for adjusting said holding means to vary the pressure of said platen roller against said drum and of said counter roller against said moistening roller, and means for moving said holding means out of holding position, said platen roller supporting means moving to said second position upon movement of said holding means out of holding position, said counter roller supporting means being mounted to move into a position in which said counter roller is spaced from said moistening roller upon movement of said platen roller supporting means to said second position.

25. In a duplicating machine, a drum, a platen roller, a moistening roller mounted to rotate about a fixed axis, a counter roller cooperating with said moistening roller, supporting means for said platen roller movable between two alternative positions, supporting means for said counter roller mounted on said platen roller supporting means for limited yielding movement relative thereto in a direction to move said counter roller toward and away from said moistening roller, and means for holding said platen roller supporting means in a position with said platen roller in position to press sheets against said drum and said counter roller in position to press sheets against said moistening roller.

26. In a duplicating machine, a drum, a platen roller, supporting means for said platen roller movable between a position in which said platen roller presses sheets against said drum and a position in which said platen roller is spaced from said drum, a moistening roller mounted to rotate about a fixed axis, a counter roller, supporting means for said counter roller mounted on said platen roller supporting means for movement relative thereto, means urging said counter roller toward said moistening roller, means for holding said platen roller supporting means in said first position, and means for moving said holding means out of holding position, said platen roller supporting means moving to said second position upon movement of said holding means out of holding position, said counter roller supporting means being mounted to move into a position in which said counter roller is spaced from said moistening roller upon movement of said platen roller supporting means to said second position.

27. In a duplicating machine, a drum, a platen roller, supporting means for said platen roller movable between a position in which said platen roller presses sheets against said drum and a position in which said platen roller is spaced from said drum, a moistening roller, a counter roller, supporting means for said counter roller mounted on said platen roller supporting means for movement relative thereto, means urging said counter roller toward said moistening roller, means detachably mounting said platen roller and said counter roller on said supporting means for independent rotation, means for holding said platen roller supporting means in said first position, and means for moving said holding means out of holding position, said platen roller supporting means moving to said second position upon movement of said holding means out of holding position, said counter roller supporting means being mounted to move into a position in which said counter roller is spaced from said moistening roller upon movement of said platen roller supporting means to said second position.

28. In a duplicating machine, a drum, a platen roller operable to press sheets against the drum, a moistening roller, a counter roller operable to press sheets against the moistening roller, a common supporting means for said platen roller and said counter roller, said supporting means being movable between two limiting positions in one of which the platen roller and the counter roller are pressed against the drum and the moistening roller and in the other of which the platen roller and counter roller are completely separated from the drum and moistening roller, said common supporting means including pivoted arms carrying said platen roller, arms movably mounted on said first named arms carrying said counter roller, a cross bar spaced from said pivots connected with said first named arms to move the same in unison about their pivots, a toggle having one end connected with said cross bar, a pivotal mounting for the other end of said toggle, spring means connected to said toggle to urge it into either folded or straight position upon movement thereof toward said position and manual means for moving said toggle toward either folded or straight position.

29. In a duplicating machine, a drum, a platen roller operable to press sheets against the drum, a moistening roller, a counter roller operable to press sheets against the moistening roller, a common supporting means for said platen roller and said counter roller, said supporting means being movable between two limiting positions in one of which the platen roller and the counter roller are pressed against the drum and the moistening roller and in the other of which the platen roller and counter roller are completely separated from the drum and moistening roller, said common supporting means including pivoted arms carrying said platen roller, arms movably mounted on said first named arms carrying said counter roller, a cross bar spaced from said pivots connected with said first named arms to move the same in unison about their pivots, a toggle having one end connected with said cross bar, a pivotal mounting for the other end of said toggle, spring means connected to said toggle to urge it into either folded or straight position upon movement thereof toward said position and means for adjusting the pressure of said counter roller against said moistening roller.

30. In a duplicating machine, a drum, a platen roller operable to press sheets against the drum, a moistening roller, a counter roller operable to press sheets against the moistening roller, a common supporting means for said platen roller and said counter roller, said supporting means being movable between two limiting positions in one of which the platen roller and the counter roller are pressed against the drum and the moistening roller and in the other of which the platen roller and counter roller are completely separated from the drum and moistening roller, said common supporting means including pivoted arms carrying said platen roller, arms movably mounted on said first named arms carrying said counter roller, means for adjusting the pressure of said counter roller toward said moistening roller, a cross bar spaced from said pivots connected with said first named arms to move the same in unison about their pivots, a toggle having one end connected with said cross bar, a pivotal mounting for the other end of said toggle, spring means connected to said toggle to urge it into either folded or straight position upon movement thereof toward said position and means for adjusting the position of said pivotal mounting for said toggle.

31. In a duplicating machine, a drum, a platen roller operable to press sheets against the drum, a moistening roller, a counter roller operable to press sheets against the moistening roller, a common supporting means for said platen roller and said counter roller, said supporting means being movable between two limiting positions in one of which the platen roller and the counter roller are pressed against the drum and the moistening roller and in the other of which the platen roller and counter roller are completely separated from the drum and moistening roller, said common supporting means including pivoted arms carrying said platen roller, arms movably mounted on said first named arms carrying said counter roller, a cross bar spaced from said pivots connected with said first named arms to move the same in unison about their pivots, a toggle having one end connected with said cross bar, a pivotal mounting for the other end of said toggle, and spring means connected to said toggle to urge it into either folded or straight position upon movement thereof toward said position.

32. In a duplicating machine, side frames, a drum rotatably mounted thereon, combined feeding and moistening rollers mounted on said side frames in position to feed copy sheets to the drum, drive means for said drum and rollers, and means to moisten one of said combined feeding and moistening rollers, the moistened roller having a rigid core and a resilient rubber covering, the core extending beyond the covering at the ends, end seal discs on said core, and resilient members pressing said discs against the ends of said covering.

GEORGE J. RUNDBLAD.

REFERENCES CITED

The following references are of record in the file of this patent:

UNITED STATES PATENTS

| Number | Name | Date |
| --- | --- | --- |
| 1,602,228 | Huestis | Oct. 5, 1926 |
| 1,788,782 | Thatcher | Jan. 13, 1931 |
| 2,061,525 | Storck | Nov. 17, 1936 |
| 2,129,179 | Kokay | Sept. 6, 1938 |
| 2,155,692 | Storck | Apr. 25, 1939 |
| 2,185,682 | Pittman | Jan. 2, 1940 |
| 2,267,982 | Kokay | Dec. 30, 1941 |
| 2,299,967 | Denison | Oct. 27, 1942 |
| 2,307,555 | Wilderson | Jan. 5, 1943 |
| 2,337,721 | Kokay | Jan. 5, 1943 |
| 2,340,327 | Jagger et al. | Feb. 1, 1944 |
| 2,349,634 | Neal | May 23, 1944 |
| 2,380,004 | Wilderson | July 10, 1945 |
| 2,407,443 | Peterson | Sept. 10, 1946 |
| 2,416,449 | Levenhagen | Feb. 25, 1947 |